US011822877B2

(12) United States Patent
Alvord

(10) Patent No.: US 11,822,877 B2
(45) Date of Patent: Nov. 21, 2023

(54) INTELLIGENT ELECTRONIC SIGNATURE PLATFORM

(71) Applicant: LawHQ, LLC, Salt Lake City, UT (US)

(72) Inventor: Thomas Alvord, Lee's Summit, MO (US)

(73) Assignee: LawHQ, LLC, Salt Lake City, UT (US)

( * ) Notice: Subject to any disclaimer, the term of this patent is extended or adjusted under 35 U.S.C. 154(b) by 0 days.

(21) Appl. No.: 17/516,177

(22) Filed: Nov. 1, 2021

(65) Prior Publication Data
US 2023/0134056 A1 May 4, 2023

(51) Int. Cl.
*G06F 40/174* (2020.01)
*G06F 16/958* (2019.01)
*G06F 3/04842* (2022.01)
*G06F 40/106* (2020.01)
*G06F 40/117* (2020.01)
(Continued)

(52) U.S. Cl.
CPC ........ *G06F 40/174* (2020.01); *G06F 3/04842* (2013.01); *G06F 16/958* (2019.01); *G06F 40/106* (2020.01); *G06F 40/117* (2020.01); *G06F 40/171* (2020.01); *G06F 40/186* (2020.01); *G06F 40/194* (2020.01); *G06F 40/197* (2020.01)

(58) Field of Classification Search
CPC .... G06F 40/174; G06F 40/194; G06F 40/186; G06F 40/171; G06F 40/197; G06F 40/117; G06F 40/106; G06F 16/958; G06F 3/04842
See application file for complete search history.

(56) References Cited

U.S. PATENT DOCUMENTS 4,524,386 A * 6/1985 Scott ...................... G09B 9/006
 348/121
6,813,603 B1 * 11/2004 Groner .................. G06F 40/174
 704/235
(Continued)

FOREIGN PATENT DOCUMENTS

CA 2710208 A1 * 6/2009 ........... G06F 17/243
WO WO-2004068290 A2 * 8/2004 ......... G06F 17/2247

OTHER PUBLICATIONS

International Search Report and Written Opinion received for PCT Patent Application No. PCT/US2022/046879, dated Nov. 17, 2022, 15 pages.

*Primary Examiner* — Shahid K Khan
(74) *Attorney, Agent, or Firm* — SHOOK, HARDY & BACON L.L.P.

(57) ABSTRACT

Computerized systems and methods are directed to functionality and architecture that is responsible for, among other things, generating a document that is native to an application, user collaboration at the document in near real-time, generating fields in the document, assigning specific fields to specific users to populate, and sending out the document for signature, all within a single editing module or document that is device responsive. Additionally, such functionality and architecture improves existing user interface functionality relative to existing technologies. Moreover, such functionality and architecture improves computer resource consumption (for example storage costs, CPU, and the like.)

17 Claims, 21 Drawing Sheets

(51) Int. Cl.
*G06F 40/186* (2020.01)
*G06F 40/197* (2020.01)
*G06F 40/194* (2020.01)
*G06F 40/171* (2020.01)

(56) References Cited

U.S. PATENT DOCUMENTS

| | | | | |
|---|---|---|---|---|
| 7,702,999 B1* | 4/2010 | Sperr | | G06F 40/174 |
| | | | | 715/221 |
| 8,413,070 B1* | 4/2013 | Castrucci | | G06F 40/174 |
| | | | | 715/830 |
| 8,522,134 B1* | 8/2013 | Zetlen | | G06F 40/117 |
| | | | | 715/234 |
| 2003/0055748 A1* | 3/2003 | Bezrukov | | G06F 40/174 |
| | | | | 715/202 |
| 2004/0049740 A1* | 3/2004 | Petersen | | G06F 40/174 |
| | | | | 715/244 |
| 2004/0148576 A1* | 7/2004 | Matveyenko | | G06F 40/143 |
| | | | | 715/273 |
| 2004/0181756 A1* | 9/2004 | Berringer | | G06F 21/64 |
| | | | | 713/176 |
| 2004/0205529 A1* | 10/2004 | Poulose | | G06F 40/174 |
| | | | | 715/205 |
| 2005/0065933 A1* | 3/2005 | Goering | | G06F 16/958 |
| | | | | 707/999.009 |
| 2005/0086483 A1* | 4/2005 | Singh | | G06Q 20/382 |
| | | | | 713/176 |
| 2005/0120298 A1* | 6/2005 | Petrujkic | | G06Q 10/06311 |
| | | | | 715/229 |
| 2006/0107197 A1* | 5/2006 | Friend | | G06F 40/174 |
| | | | | 715/234 |
| 2007/0250769 A1* | 10/2007 | Bass | | G06F 40/174 |
| | | | | 715/234 |
| 2009/0259949 A1* | 10/2009 | Verlaan | | G06F 40/166 |
| | | | | 715/760 |
| 2011/0093807 A1* | 4/2011 | Dunn | | G06Q 10/10 |
| | | | | 715/780 |
| 2011/0145097 A1* | 6/2011 | Berger | | G06F 16/258 |
| | | | | 705/26.7 |
| 2012/0089659 A1* | 4/2012 | Halevi | | G06F 16/9577 |
| | | | | 709/201 |
| 2012/0179756 A1* | 7/2012 | Colella | | H04L 63/08 |
| | | | | 709/204 |
| 2013/0097480 A1* | 4/2013 | Allison | | G06Q 10/10 |
| | | | | 715/223 |
| 2014/0149883 A1* | 5/2014 | Anand | | G06F 3/04842 |
| | | | | 715/751 |
| 2016/0179776 A1* | 6/2016 | Bartley | | G06Q 20/027 |
| | | | | 715/268 |
| 2018/0089412 A1* | 3/2018 | Kopikare | | G06F 40/174 |
| 2018/0181378 A1* | 6/2018 | Bakman | | G06F 8/38 |
| 2019/0074976 A1* | 3/2019 | Hancock | | G06F 3/1454 |
| 2019/0155894 A1* | 5/2019 | Gandhi | | G06F 40/106 |
| 2019/0303430 A1* | 10/2019 | Cockerham | | G06F 3/04842 |
| 2020/0110792 A1* | 4/2020 | Tsabba | | G06F 3/167 |
| 2022/0398284 A1* | 12/2022 | Singh | | G06F 40/174 |

* cited by examiner

ATTORNEY CLIENT AGREEMENT

THIS AGREEMENT IS ENTERED INTO BETWEEN [FUNDED TODAY] LOCATED AT [419 S 10 WASHINGTON SOUTH OGDEN, UT] AND COMPANY A. LOCATED AT 100 MAIN ST / #1000 SALT LAKE CITY, UT 84111.

COMPANY A ALSO AGREES TO [PROVIDE MARKETING SERVICE.]

SIGNATURE
NAME

INTELLIGENT ELECTRONIC SIGNATURE PLATFORM

BACKGROUND

A variety of computer-implemented technologies are available to assist users in formulating and exchanging, over a computer network, electronic documents where electronic signatures are required. For example, some web applications are configured to upload specific file attachments after file conversion (e.g., from WORD to PDF) and then process repetitive manual user input in order to assign signature fields for particular parties to sign (e.g., via a Public Key Infrastructure (PKI) digital signature). However, these technologies fail to, among other things, include a text editor module that allows users to directly input fields into a native web application document (e.g., a Hyper Text Markup Language (HTML) document) while the user is also providing other content to the document. These technologies further lack robust user interface functionality necessary to complete tasks. These technologies also unnecessarily consume computing resources (e.g., CPU and memory), as described in more detail herein.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The technologies described in this disclosure are directed to improving existing electronic signature and related technologies via computer-implemented functionality and architecture that allows users to, among other things, draft a document that is native to an application (e.g., the document does not have to be converted and uploaded from a local file). Such computer-implemented functionality and architecture are also responsible for: user collaboration at the document in near real-time, generating fields (e.g., a data structure for holding certain data types) in the document, assigning specific fields to specific users to populate, and sending out the document for signature, all within a single editing module or document that is device responsive (e.g., mobile responsive). Additionally, various embodiments of the technologies described herein improve existing user interface functionality relative to existing technologies. Moreover, various embodiments of the technologies described herein improve computer resource consumption (e.g., storage costs, CPU, etc.).

BRIEF DESCRIPTION OF THE DRAWINGS

Aspects of the disclosure are described in detail below with reference to the attached drawing figures, wherein:

FIG. 2 is a screenshot of a user interface that illustrates a document where natural language text, fields, and field types can be generated, according to some embodiments;

FIG. 3 is a screenshot of an example user interface that illustrates how signature fields are generated, according to some embodiments;

FIG. 4 is a screenshot of an example user interface that illustrates how signature fields are assigned, according to some embodiments;

FIG. 5B is a screenshot of an example user interface illustrating WRITE access available to field assignees, according to some embodiments;

FIG. 7A is a screenshot of an example user interface illustrating template generation functionality, according to some embodiments;

FIG. 8A illustrates a computing device that is displaying a mobile responsive screenshot, according to some embodiments;

DETAILED DESCRIPTION

Figure 1:
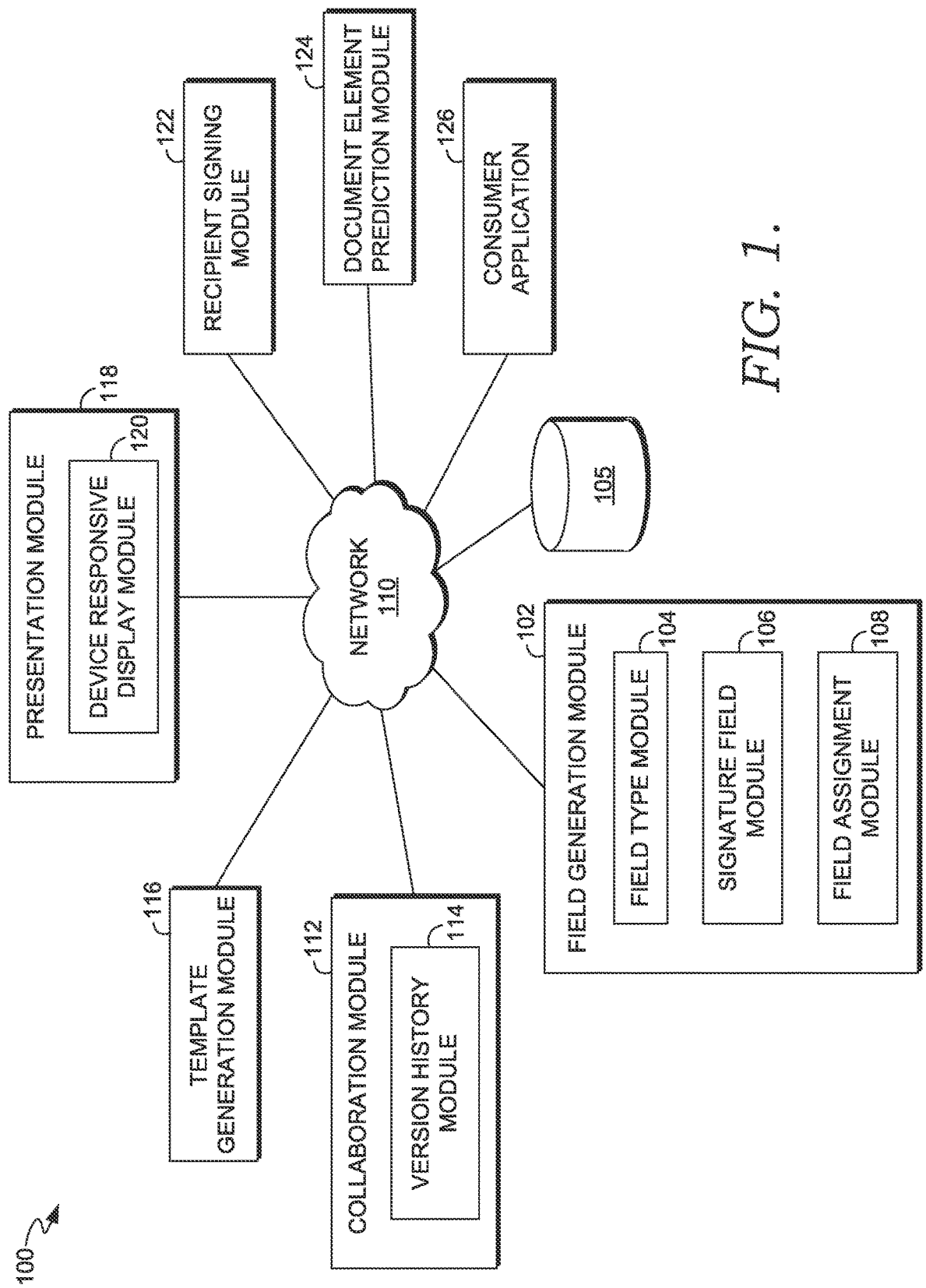
FIG. 1 is a block diagram illustrating an example computing system architecture suitable for implementing some embodiments of the disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

As described above, existing technologies have various shortcomings. For instance, web applications, such as DOCHUB® and DOCUSIGN®, currently employ functionality configured to generate fields at documents only when those documents have been converted, by user devices, from a WORD format into a PDF format. For example, a user may first open a WORD document that is locally stored to the user device and input natural language characters indicative of an agreement (e.g., an attorney-client agreement). Responsively, the user device may continuously send and receive, over a computer network, the document to and from other parties' devices with "track changes" functionality in order to finalize the document between all parties. After the document is finalized, the document must then be converted into a PDF format and saved to computer memory in preparation for electronic signing. Subsequently, the user device must initiate a web session by opening a browser client application and then query or input a particular URL to open a web application and initiate an application session to sign a document. Often, the web application may require uploading of the document (in PDF format only) and thus the user may have to manually open operating system dialogue boxes and access the PDF file stored locally in order to upload the PDF document to the web application. The user may then manually input and manage fields at the PDF document (e.g., drag a signature field over the PDF document), input values, and then submit a signature request out to other parties. All such manual user inputs are extensive, arduous for users, and unnecessary.

Further, these existing technologies also fail to automatically format content at documents based at least in part on user device screen size or type. For example, documents uploaded to DOCHUB® and DOCUSIGN® are not mobile responsive when users try to open documents using a web browser and on a mobile device. Mobile responsiveness is the concept of a code base modifying a display layout and its content based on the size of the screen it is presented on. Responsive applications automatically change to fit the device a user is interfacing with at the application. However, these technologies and others are not mobile responsive partly because of the difficulty of formatting the required PDF documents themselves, rather than web pages. This causes unnecessary user input, such as manual scrolling to view the entire document.

Various existing technologies employ user interfaces that are not navigation-friendly, are arduous to use, and require extensive drilling and other user input. For instance, after initiating a web application session, some technologies first render a page of several fields and request users to pre-populate these fields before the user is even able to view or access the document he or she will formulate. For example, a user may have to fill out the names of the parties of an agreement, the names of persons signing the agreement, the title of an agreement, and other fields before she can even draft an agreement. However, these technologies do not provide access to the native document itself in parallel to the user and so the user may not be able to view or input characters to formulate the actual agreement itself. Responsive to receiving this input of field information, these technologies may then have to switch application pages in order to populate a document with these fields or allow the user to engage in drafting the agreement. However, these technologies provide no clear signals for how to navigate to the document that the user will work in. All of this is non-intuitive for users because they cannot view or access the document that will include the fields that they must generate. When the fields are finally input into the actual document, the user may have to provide unnecessary manual user input to adjust the formatting based on populating the document with fields that may be unevenly spaced or aesthetically unpleasing to the user. Accordingly, these user interfaces do not allow the users to simultaneously input characters (e.g., formulate and agreement), as well as input fields (e.g., names of parties, address of parties, etc.) all within the same native document at substantially the same time, as would naturally occur had a user drafted a tangible written document, for example. Therefore, these user interfaces are arduous to use and require extensive user input.

Computers are also inefficient in terms of computer resource consumption (e.g., memory, CPU, I/O, network latency) via these existing technologies. For example, computer memory is unnecessarily consumed. When a user receives and completes a document for signature, the information of the signee is saved in the document. This causes a saving operation of the content of the entire document to be performed in computer memory each time the document is completed by a new signee. Consequently, for example, if a user had one million people sign a ten-page document, the document would have to be saved in computer memory one million times and therefore 100 million pages of content would have to be saved in computer memory. This dramatically increases storage requirements and costs.

Similarly, storage device input/output (I/O) is increased. Since a saving operation of the content of the entire documents has to be performed each time a document is completed by a new signee, there is an increase in storage device I/O (e.g., excess physical read/write head movements on non-volatile disk) because storage managing modules may have to reach out to disk every time to perform such saving operation. This is error prone due to the redundant mechanical movements of a read/write head. The read/write head will also experience rapid wear and decline due to these unnecessary movements.

In like manner, there are also unnecessary computer network costs when web application servers are communicating with user devices. For example, there are packet generation costs that adversely affect computer network communications. Each time a user signs the document and the corresponding user device sends the document to a web application server for a saving request, for example, the contents or payload of the request is typically supplemented with header information or other metadata within a packet in TCP/IP and other protocol networks. Accordingly, when this functionality is multiplied by all the signees' savings requests, throughput and latency costs at the web application servers are inevitable because of the repetitive generating and processing of the metadata and sending the same over the computer network to each user device.

The extensive manual user input required by existing technologies also unnecessarily consumes computer resources. For example, as described above, technologies such as DOCHUB® and DOCUSIGN® require extensive manual user input for document conversion, document upload to the web application, and document generation. However, such repetitive inputs result in increased packet generation costs that adversely affect computer network communications because each input made at the user device has to be communicated, over the computer network, to a web application server (or other servers) and the web application server must similarly process each input and render corresponding user interface elements. Formulating and processing such packets corresponding to the repetitive inputs increases network latency and decreases throughput. Similarly, these repetitive inputs results in increased I/O because each input can result in a read/write to or from disk, thereby increasing the likelihood of errors and disk wear.

Various embodiments of the present disclosure provide one or more technical solutions to one or more of these technical problems described above. Particular embodiments are directed to computer-implemented functionality and architecture that allows users to, among other things, draft a document that is native to a web application, collaborate in near real-time with other users, insert fields in the document, assign the fields to specific users, and send out the document for signature, all within one editing module that is mobile or device responsive.

In operation, particular embodiments receive, over a computer network, a first request to open a document of a web application and the document is responsively rendered. In some embodiments, the document is native to the web application that the document is run on. As used herein, the term "native" means that the document is made up of a code base (e.g., HTML) that includes routines, functions, instructions, and/or data structures that is a part of the web application itself. In these embodiments, the document excludes or is not part of any other application or code base. For example, a web application along with a client application browser may include a workflow that brings a user to a page that includes an HTML document. But such document may not be from any outside application, format, or source. Rather, the business logic of the web application may include the document and its rendering to users. For instance, the document may not be a WORD document or a PDF document because these types of documents are not part of a web application workflow. In other words, these embodiments do not require users to upload documents from outside sources. This allows the user to seamlessly work in the document without unnecessary repetitive user input, as described in more detail below.

Particular embodiments receive, over the computer network and via a user device, a set of characters (e.g., a first partial string) based on a computer user input of the set of characters at the native document on a first page of the web application. For example, a user may begin formulating a first paragraph of a natural language agreement between parties at the native document on a first page of the web application. Subsequent to receiving the set of characters, particular embodiments receive, over the computer network and via a selection at the first page, a second request to input a field (e.g., a signature field, a name field, a company field, etc.) next to the set of characters. For example, using the illustration above, a user may select a "parties" field button at the first page that the native document is on so that the user can seamlessly place the names of the parties of the agreement after the first set of characters. Responsively, the user device may transmit, over the computer network, an indication of such selection so that the web application server can receive such indication. In response to receiving the second request, particular embodiments automatically cause generation, at the native document on the first page of the field next to the set of characters. The user is then free to populate such field. Other embodiments and functionality is described in more detail herein.

Various embodiments of the present disclosure improve existing technologies. For example, as described above, existing web applications are configured to generate fields at documents only when those documents have been converted, by user devices, from a WORD format into a PDF format. However, these embodiments do not require such conversion because they employ a document and text editor that is native to the application, so that the user is free to directly work in the document at the application. Thus, the user does not have to first open a WORD document that is locally stored to the user device and input natural language characters indicative of an agreement. As such, the user device also does not have to continuously send and receive, over the computer network, the document to and from other parties' devices with "track changes" functionality in order to finalize the document between all parties. Rather, particular embodiments employ automated collaboration functionality that allows users to view the native document based on milestone changes at the web application, as described in more detail below. Various web application embodiments do not require the user to upload the document in PDF format only. Accordingly, the user does not have to manually open operating system dialogue boxes and access the PDF file stored locally in order to upload the PDF document to the web application. Some embodiments contain automated field suggestion or population (e.g., via machine learning functionality) so the user does not have to manually perform as much input to manage fields, input values, as described in more detail herein. Therefore, various embodiments of the present disclosure are directed to functionality and architecture that overcomes need of extensive manual user input unlike existing technologies.

As opposed to requiring users to perform such extensive manual user input, particular embodiments can perform automated functionality based on certain new rules. For example, particular embodiments can automatically suggest or input a field at a document because a model has predicted that the user will place the field in the document based on past history inputs by the user and/or other signals, such as Natural Language Processing (NLP). Currently, users can only manually place and populate fields at documents based on a web application surfacing a pop-up window, for example, requesting the user to insert a field. In other examples, some embodiments automatically format a document to become mobile responsive based on new rules, as described in more detail below.

Various embodiments also improve these technologies because they automatically format content at documents based at least in part on user device screen size or type. As described above, documents uploaded to DOCHUB® and DOCUSIGN® are not mobile responsive when users try to open them using the web browser in the mobile device. However, various embodiments are mobile responsive because they automatically format a document by automatically wrapping natural language text and/or fields or otherwise change position in documents based on new rules according to device screen size. For example, if a field is over a threshold length or type (e.g., a signature field, address field, parties field), it can be automatically re-sized and/or re-positioned (e.g., a signature field can be placed further below the end of the natural language portion of the document at a mobile screen relative to a laptop to make it more readable) according to size of the device. In this way, a user does not have to perform unnecessary user input, such as manual scrolling to view the entire field since the field size will either be reduced or be re-positioned.

Various embodiments also improve existing technologies by employing user interfaces that are navigation-friendly, are intuitive to use, and do not require extensive drilling and other user input. For instance, after initiating a web application session, various embodiments directly render a page that includes a native document that the user can work in and create/assign fields at the same page. This reduces navigation steps that other technologies perform. As described above, some technologies first render a page of several fields to request users to pre-populate these fields before the user is able to view or access the document he or she will formulate. Other technologies require that the user device first convert the document from one format into another and then require web applications to cause users to upload these converted documents. No such steps are required in certain embodiments. Rather, these embodiments immediately provide access to the native document itself to the user so that the user is able to view or input characters and fields to formulate the actual agreement all in a single user interface page. The "look and feel" of the user interface is thus more intuitive to the user relative to the other technologies.

Contrary to the existing technologies, the present disclosure eliminates need of an application page switch rendering in order to populate a document with these fields users have previously created in order to allow the user to engage in drafting the agreement. Accordingly, the user does not have to navigate or otherwise drill down to the document. Rather, in these embodiments, the document creation and field generation functionality will all be provided at single page without drilling. This is intuitive for users because they are able to immediately view or access the document that will include the fields that they must input and immediately be able to work (e.g., assign fields and write up the agreement) at the same page. Accordingly, these user interfaces allow the users to simultaneously input characters (e.g., formulate and agreement), and input fields (e.g., names of parties, address of parties, etc.) all within the same native document and on the same page at substantially the same time, as would naturally occur had a user drafted a tangible written document. In this way, there is no need to adjust the formatting or otherwise change the document based on the user having to first input fields in places other than a native document or other functionality because the user can both input the fields and other natural language characters at the native document.

Particular embodiments also improve the way computers operate in terms of computer resource consumption. For instance, some embodiments reduce data storage to storage devices. In an illustrative example, when a document is sent out for signature, the contents of the document is automatically saved, in a data store (e.g., a relational database), as a template. In these embodiments, when someone receives and completes a document for signature, the signee's submitted information is not saved in the document like existing technologies but is instead saved to the data store and associated with the template. By saving the signee's submitted information in the data store instead of in the document, particular embodiments do not have to save the content of the entire document each time the document is completed by a new signee. Consequently, using the illustrative example above, if the user had one million people sign a ten-page document, instead of saving the document one million times and needing to store 100 million pages of content, particular embodiments would only need to save 10 pages of content. This reduces storage requirements and storage costs by up to 99%.

Similarly, storage device I/O is reduced. Since a saving operation of the content of the entire documents does not have to be performed each time a document is completed by a new signee unlike existing technologies, there is decreased storage device I/O (e.g., reduced physical read/write head movements on non-volatile disk) because a storage managing module do not have to reach out to disk every time to perform such saving operation since it is saved to the data store. Accordingly, the storage device is not as error prone because there are a lot less redundant mechanical movements of a read/write head. The read/write head is less likely to experience rapid wear and decline because there are not as many movements of the read/write head.

In like manner, there are also computer network cost savings when web application servers are communicating with user devices. As described above, each time a user signs the document and the corresponding user device sends the document to the web application server for a saving request, for example, the contents or payload of the request is typically supplemented with header information or other metadata within a packet in TCP/IP and other protocol networks. However, because particular embodiments use the data store to store and save the document, the redundant saving/storing functionality is not multiplied by all the signees' savings requests. In this way, there are not as many throughput and latency costs at the web application servers because there is no repetitive generation and processing of this metadata and sending it over a computer network to each user device.

Various embodiments also improve computer resource consumption because there is not as much extensive manual user input relative to other technologies. For example, as described above, technologies such as DOCHUB® and DOCUSIGN® require extensive manual user input for document conversion, document upload to a web application, and document generation. However, as described above, various embodiments do not require these repetitive inputs, such as conversion, document upload, and the like. Accordingly, this results in decreased packet generation costs because several inputs made at the user device do not have to be communicated, over the computer network, to the web application server (or other servers). Therefore, particular embodiments formulate and process fewer packets because there are fewer repetitive inputs to process, which decreases network latency and increases throughput. Similarly, processing fewer inputs in these embodiments result in decreased I/O because fewer user inputs means that there are fewer reads/writes to or from disk, thereby decreasing the likelihood of error and disk wear.

Referring now to FIG. 1, a block diagram is provided showing aspects of an example computing system architecture suitable for implementing embodiments of the disclosure and designated generally as "the system 100". The system 100 represents only one example of a suitable computing system architecture. Other arrangements and elements can be used in addition to or instead of those shown, and some elements may be omitted altogether for the sake of clarity. Further, many of the elements described herein are functional entities that may be implemented as discrete or distributed components or in conjunction with other components, and in any suitable combination and location.

The system 100 includes a network 110, which is described in connection to FIG. 14 and which communicatively couples components of the system 100 including a field generation module 102, a collaboration module 112, a template generation module 116, a presentation module 118, a recipient signing module 122, a document element prediction module 124, a consumer application 126, and a storage 105. These components may be embodied as a set of compiled computer instructions or functions, program modules, computer software services, or an arrangement of processes carried out on one or more computer systems, such as computing device 1500 described in connection to FIG. 15.

In some embodiment, the functions performed by components of the system 100 are associated with one or more personal assistant applications, services, or routines. In particular, such applications, services, or routines may operate on one or more user devices (such as a user device 1502a), servers (such as a server 1506), and may be distributed across one or more user devices and servers or be implemented in a cloud. Moreover, in some embodiments, these components of the system 100 may be distributed across a network, including one or more servers (such as the server 1506) and client devices (such as the user device 1502a), in the cloud, or may reside on a user device (such as user device 1502a). Moreover, these components, functions performed by these components, or services carried out by these components may be implemented at appropriate abstraction layer(s), such as the operating system layer, application layer, hardware layer of the computing system(s). Alternatively, or in addition, the functionality of these components and/or the embodiments described herein can be performed, at least in part, by one or more hardware logic components. For example, and without limitation, illustrative types of hardware logic components that can be used to include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs). Additionally, although functionality is described herein with regards to specific components shown in example system 200, it is contemplated that in some embodiments functionality of these components can be shared or distributed across other components.

Continuing with FIG. 1, the system 100 is generally responsible for generating a document that is native to a web application to allows users to draft the contents of the document, employ collaboration functionality to allows users to collaborate in near real-time with other users, insert fields in the document, assign the fields to specific users, and send out the document for signature, all within one editing module that is device responsive. The system 100 includes the field generation module 102, the collaboration module 112, the template generation module 116, the presentation module 118, the recipient signing module 1122, the document element prediction module 124, the consumer application 126, and storage 105, each of which is communicatively coupled via the one or more networks 110.

The field generation module 102 is generally responsible for generating one or more fields. In some embodiments, a "field" as described herein refers to (along with its ordinary meaning), a data object (e.g., an array, table, record, pointer, file, etc.) or data structure corresponding to a predetermined category for which one or more users are to input data at the field according to the predetermined category. A "predetermined category" refers to a type or class that the hosting application (e.g., the consumer application 126) generates or determines at build time or prior to run time (e.g., prior to a session where a user requests to edit a document). In some embodiments, the field generation module 102 generates fields automatically (without a user request). Alternatively, in some embodiments, the field generation module 102 generates fields in response to a user request to input such fields.

In an illustrative example of the functionality of the field generation module 102, the field generation module 102 may first receive an indication that a user has selected an "input signature field" button. In response to the receiving of this indication, the field generation module 102 may responsively generate the signature field (e.g., access the field from memory) and programmatically call the presentation module 118 so that the presentation module 118 causes display of such signature field.

The field type module 104 is generally responsible for generating particular type of field corresponding to the predetermined category. Such field type can be any suitable field type, such as a signature field, a company name field, a personal name field, an email address field, a job title field, or a residential/business address field. In an illustrative example, in response to receiving an indication that the user has selected a "company name" field, the field type module 104 can generate a field with the string "type in company name." Subsequently, the user may input the company name in the field.

The signature field module 106 is generally responsible for functionality that allows a user to input her signature into a signature field, as well as input associated information. For example, the signature field module 106 may provide options to users for them to draw their signatures, type their signatures, or upload their signatures, as described, for example, with respect to FIG. 5C. Other examples of functionality that may be produced by the signature field module 106 are described with respect to FIG. 3, FIG. 5A, FIG. 5B, and FIG. 5D, as described in more detail below.

The field assignment module 108 is generally responsible for assigning a particular field to a particular user to populate. In some embodiments, assigning includes (or is supplemented by) storing, in a data store, an identifier identifying different persons and then programmatically flagging (e.g., a TRUE value) the ID, which is indicative that the person is assigned to populate the field. Alternatively or additionally, in some embodiments, assigning includes (or is supplemented by) transmitting, over the network(s) 110, a notification to a device associated with the flagged ID so that the assignee is aware and able to populate the corresponding field. For example, there may be a data structure (e.g., a hash map) that includes names of various people and their corresponding phone numbers or email addresses. Accordingly, the field assignment module 108 may read such data structure to determine who is assigned a particular field and then read the same record to determine the phone number of that person so that a notification can be sent to the corresponding device. Such notification to the device can occur by any suitable transmission method or protocol, such as Short-Message Service (SMS) text message, email, telecommunications phone call, notification to an app, and/or the like.

In some embodiments, the field assignment module 108 (or the field generation module 102 in general) performs its functionality in response to receiving a user request to assign/generate a field to a particular person. For example, a user may select a name, from a list of names in a drop-down menu of those collaborating on a document. Additionally or alternatively, the user may input or select an email address corresponding to the name. Responsively, particular embodiments transmit, over the network(s) 110, a notification to a device (e.g., an email server or user device). In some embodiments, such notification includes a link (e.g., a hyperlink) to the document that contains the field in which the assignee is required to sign.

The collaboration module 112 is generally responsible for generating functionality at an application (e.g., the consumer application 126) to help multiple people work together at a single document or file to achieve a single final version. Such functionality allows people to view, edit, and work simultaneously on a document without sending email attachments to each other. In some embodiments, such functionality includes employing a single data store or host device (e.g., storage 105) that stores a single native document that is responsive to automatic requests (e.g., in parallel) sent from user devices, over the network(s) 110, to store the users' changes. For example, a web application server may automatically save user input of a first user to a document at every X milestone reached (e.g., every 5 minutes) and responsively transmit, over the network(s) 110, the saved contents to the storage 105. In parallel or subsequently, the web application server may automatically save other user input of a second user of the same document at every milestone reached and responsively transmit, over the network(s) 110, the saved contents to the storage 105. Responsively, in some embodiments the collaboration module 112 updates the document with the latest changes so that the web application can continuously render the newest updates of the documents. In this way the collaboration module 112 can track, store, and render users' changes in real time on the same document so that users can make and view document changes in real-time.

The version history module 114 is generally responsible for generating tags or other marks in the content of a document based on changes to the document when milestones are reached and then making corresponding renderings in documents so that users can view changes between milestones. In some embodiments, such tags (e.g., a natural language phrase) or marks (e.g., colored highlights) indicate user changes to a document corresponding to user input (e.g., editing of the content or inputting fields) since the last milestone. A "milestone" as described herein refers to an occurrence of an event and/or lapse of a threshold quantity of time (e.g., 2 minutes) that triggers such markings, a saving operation, and/or rendering operation of the content with the marking.

Described below are various examples of milestones. For instance, an event milestone can be receiving an indication that a user has accepted a collaboration request to collaborate on a document. In another example, an event milestone can be a manual user request to save the contents of the document. In yet another example, an event milestone can be receiving an indication (e.g., via performing natural language processing (NLP)) that a user is getting ready to send the document to another user. For example, particular embodiments may receive a natural language phrase, via an email, that says, "Okay, I'm getting ready to send you the document now." Particular embodiments perform NLP by tokenizing and parsing this sentence and performing semantic analysis (predict meaning of words), sentiment analysis (determine positive/negative sentiment), performing syntax analysis (detect sentence structure), and/or part-of-speech (POS) tagging of each of the words in order to predict that the user is not likely to make any other changes and therefore a tagging, saving, and/or rendering operation is necessary. In some embodiments, such NLP is performed by state-of-the-art machine learning models that include NLP functionality, such as Bidirectional Encoder Representation from Transformers (BERT), WORD2VEC, Robustly Optimized Bert (RoBERTA), and the like. In an example illustrative of a time-based milestone, the version history module 114 may tag, save, and/or render a document every 5 minutes in a continuous cycle. In some embodiments, to "render" a document includes changing an HTML document with the tags at the web application server, such that a user can access and view the document by engaging in the collaboration or a web session. In some embodiments, to "render" a document refers to directly causing a display, at a user device, of the document with the tags.

In some embodiments, in response to receiving a user request to invite a second user as a collaborator to work in the same document (or in response to receiving an indication that the second user has accepted the request), the version history module 114 saves, to the storage 105, the contents of the document. Such collaboration or accept request may correspond to a first milestone. The second user may then begin working in the document (e.g., inputting text or fields) until a second milestone occurs. Responsive to the second milestone, in some embodiments, the version history module 114 compares the content of the document at the first milestone with the user changes made to the document at the second milestone. Responsive to this comparing, in some embodiments, the version history module 114, then tags or marks each piece of content of the document that has changed from the first milestone to the second milestone. In some embodiments, in response to such tagging or marking, the presentation module 118 causes presentation, at a user device, of the document that includes the markings or tags so that users can see the changes between the milestones. In some embodiments, the presentation module 118 causes presentation of such milestones in natural language so that a user can view the criteria used for the changes. Such process can be repeated for subsequent milestones after the second milestone so that different versions of the document can be viewed by a user.

In an illustrative example of tagging or marking in view of milestones reached, at a first time a user may input a header to a document that indicates the title and parties to an agreement. No other input may have been provided by the user. In response to detecting a first milestone, the version history module 114 automatically saves to the storage 105, the document with the header contents. At a second subsequent time, the user may begin formulating a second portion of the agreement, such as a first set of terms (e.g., conditions to which a party must abide by) to the agreement. In response to detecting a second milestone, the version history module 114 may highlight the text corresponding to the first set of terms and refrain from highlighting the header since the only the text of the first set of terms changed between the first and second milestones.

The template generation module 116 is generally responsible for storing, to the storage 105, a document in response to receiving an indication that a user has requested to save the document as a template. In some embodiments, the template generation module 116 is further responsible for accessing such stored templates from the storage 105 in response to receiving a user request to render a template. A "template" as described herein refers to pre-formatted content or layout of a document. In this way, a template can be used as a starting point for a document for which a user will input other content or layouts. For example, in a contract document, a user may first engage in drafting a standard choice-of-law provision, a Force majeure clause, an indemnification clause or any other clause that the user will use for most or all contracts. Subsequent to such drafting, the template generation module 116 may receive an indication that the user has selected a button to save one or more of the clauses or content as a first template. In response to receiving such indication, the template generation module 116 may cause the first template to be saved to the storage 105. Subsequently, such as in a different web session for a different agreement, the template generation module 116 may receive a user request to access the first template (e.g., via a user interface button). Responsively, the template generation module 116 may access, from the storage 105, the first template and programmatically call the presentation module 118 in order to render the template to the user device.

Example system 100 also includes the presentation module 118 that is generally responsible for causing display of content to a user device, such as application pages and/or documents. The presentation module 118 may include (or be included in) one or more applications (e.g., the consumer application 126) or services on the user device, across multiple user devices, or in the cloud. For example, in one embodiment, the presentation module 118 manages the presentation of content to the user across multiple user devices associated with that user. Based on content logic, device features, associated logical hubs, inferred logical location of the user, and/or other user data, the presentation module 118 may determine on which user device(s) content is presented, as well as the context of the presentation, such as how (or in what format and how much content, which can be dependent on the user device or context) it is presented and/or when it is presented. In particular, in some embodiments, the presentation module 118 applies content logic to device features, associated logical hubs, inferred logical locations, or sensed user data to determine aspects of content presentation.

In some embodiments, presentation module 118 generates and causes presentation or display of user interface features. Such features can include interface elements (such as graphics buttons, sliders, menus, audio prompts, alerts, alarms, vibrations, pop-up windows, notification-bar or status-bar items, in-app notifications, or other similar features for interfacing with a user), queries, and prompts.

The device responsive display module 120 is generally responsible for automatically formatting (or reformatting) content and/or layout of a document based on or more criteria. In some embodiments, such criteria correspond to one or more of the following: program rules, display screen size (or resolution) of the user device that displays the document, the type of the user device or operating system the user is using, and/or the like. In some embodiments, such automatic formatting includes changing the font size of characters, wrapping text, changing the orientation of fields, removing characters or fields, adding characters or fields, or otherwise changing the structure or format of displayed information, as described herein.

In some embodiments, the device responsive display module 120 includes or represents functionality performed by mobile responsive design modules in order to render documents designed for users using particular devices (e.g., mobile, tablet, etc.) so that the users can easily view and navigate the document. For example, in some embodiments, the device responsive display module 120 includes components, such as HTML, CSS, media queries, fluid layouts, flexbox layouts, as described in more detail herein. Mobile responsive designs are typically designed with a single universal design, which changes across device screen sizes.

In some embodiments, however, the device responsive display module 120 includes or represents functionality performed by adaptive design modules. Adaptive design modules generate design templates that are optimized and unique for every device class. For example, a data structure (e.g., a lookup table) may include a predetermined device class or type in a key field and a template field that points to a particular template. Accordingly, the device responsive display module 120 may first receive an indication (e.g., via a user device communicating its fingerprint or type over the network(s) 110) that a user device is of a particular class. Responsively, the device responsive display module 120 may read the key field to match the received class to the class indicated in the data structure and then map that information to the corresponding template indicated in the same record.

The recipient signing module 122 is generally responsible for causing notifications to be sent to recipients that are to sign a document (i.e., have been assigned a field to sign the document at the particular field) and related functionality for recipients. For example, in some embodiments, the recipient signing module 122 may cause an email to be sent to a user's email account and generate corresponding buttons or other user interface functionality at the email page so that the user can connect with a web application that contains the document for which the recipient is required to sign. Additionally or alternatively, the recipient signing module 122 may activate (e.g., flag as accessible and writable) a signature field at a document so as to allow the recipient to sign the field that she is assigned to (e.g., by the field assignment module 108).

The document element prediction module 124 represents or uses a statistical and/or machine learning model in order to predict one or more elements that the user will incorporate at a document. Such element can be any suitable element of a document, such as a field, a word (or set of words, sentences, or other characters), a template, or the like. Responsive to such prediction, in some embodiments, the document element prediction module 124 causes an autosuggestion or recommendation (e.g., in a pop-up window) of the predicted element to users so that the users can choose to place the element in the document. Alternatively or additionally, in some embodiments, the document element prediction module 124 automatically places a predicted element in a document without user input.

Continuing with the document element prediction module 124, in some embodiments, selecting whether to automatically place elements in documents or offer recommendations to users is based on a confidence level threshold that the users will place a given element in a document. For example, if the document element prediction module 124 is 90% or more confident that the user will place a given element in a document, then the document element prediction module 124 may automatically generate and cause presentation of such element at a document. However, if the document element prediction module 124 is 89% or less confident, then it may only offer the prediction as an autosuggestion or recommendation because there is less certainty. The document element prediction module 124 is described in more detail herein.

Continuing with FIG. 1, as described previously, the example system 100 may include or operate in conjunction with one or more consumer applications 126. Consumer application 126 generally refers to one or more computer applications or services, such as online/cloud applications or locally stored apps that consume or utilize document information and functionality determined by the system 100. In particular, the consumer application 126 may be a web application that hosts a native document and corresponding user interface functionality so that the user can create documents, assign fields, and collaborate all on a single platform. In some embodiments, the consumer application 126 may integrate or work with the presentation module 118 to provide user interface features that indicate particular functionality described herein. Examples of consumer applications 126 may include, without limitation, computer applications or services, such as electronic signature web applications, meetings, or communications applications (e.g., MICROSOFT TEAMS®, MICROSOFT DYNAMICS®); document processors (e.g., an online WORD processor), email, messaging, chat, or calling; project management; calendar or scheduling; and task list or to-do applications, among other things.

The system 100 also includes the storage 105. The storage 105 generally stores information including data, computer instructions (e.g., software program instructions, routines, or services), and/or models (e.g., machine learning models) used in embodiments of the technologies described herein. In an embodiment, the storage 105 comprises a data store. In some embodiments, the storage 105 represents volatile, non-volatile, persistent, non-persistent, or any other suitable place to store data. For example, the storage 105 can include or represents Random Access Memory (RAM) or a disk storage device. Further, although depicted as a single data store component, the storage 105 may be embodied as one or more data stores or may be in the cloud.

Figure 2:
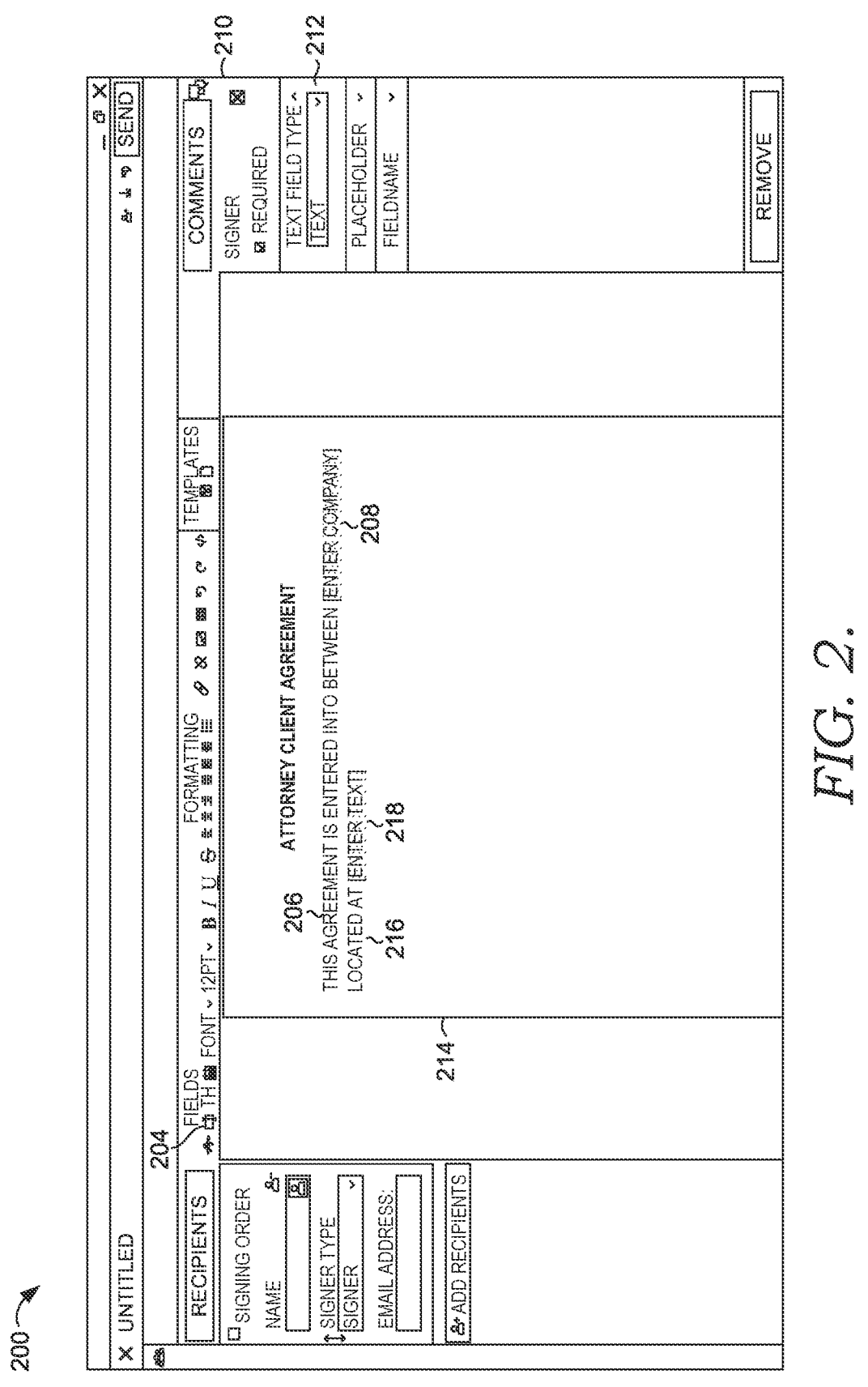

FIG. 2 is a screenshot 200 of a user interface that illustrates a document where natural language text, fields, and field types can be generated, according to some embodiments. In some embodiments, the field generation module 102 (and specifically the field type module 104) of FIG. 1 produces the functionality associated with the screenshot 200. In some embodiments, the screenshot 200 (or any screenshot described herein) represents a single "page" (e.g., a web application page), as referred to herein.

In some embodiments, the document 214 represents a document that is native to a web application (e.g., the document 214 is not uploaded from a user device). As described above, in this way, the user can immediately begin working in the document 214 after the user's associated user device establishes a communication session with the corresponding web server (e.g., via a SYN-SYNACK, ACK handshake) to open a communication channel. Subsequently, the user can immediately select a button or other user interface element to surface the document 214 (instead of uploading the document 214 from an outside source using operating system dialogues or other local file retrieval systems).

In some embodiments, the user may first begin drafting an agreement, such as inputting the title of the agreement ("Attorney Client Agreement") and partial natural language characters 206 (also referred to herein as "partial strings"). Accordingly, various embodiments first receive this user input of natural language characters and responsively cause a population and display of the characters at the document 204.

Subsequently, particular embodiments receive an indication that the user has selected the "fields" button 204. In response to receiving such indication, these embodiments logically associate or map a generic field 208 to a pointer (e.g., a mouse pointer) or other selection mechanism (e.g., touch) such that the field 208 moves responsive to user movement of the selection mechanism, thereby allowing the user to "drag" or otherwise move the field 208 to a desired location, such as next to the partial string 206 as illustrated in the screenshot 200. In some embodiments, the field 208 is represented in a compressed form (e.g., a vertical line instead of the brackets as illustrated by the reference 208) in response to receiving an indication that the user has selected the "fields" button 204. In this way, when embodiments receive an indication that the user is moving the selection mechanism to its appropriate location, the field 208 is not as bulky since it is compressed, thereby allowing the user to view more of the user interface and improving the user experience. In these embodiments, in response to receiving an indication that the user has selected a location at the document 214 where the compressed field will be placed, particular embodiments decompress the field such that it becomes field 208, as illustrated in the screenshot 200. In some embodiments, the field 208 initially includes brackets, as well as the "Enter Text" indicia (identical to the field 218), as it is configured to receive user input.

In some embodiments, in response to receiving an indication that the user has selected the field 208 (e.g., in its decompressed form) at the document 114, particular embodiments cause display of a window-pane 210 and/or the text bock 212. This allows the user to select the type of field that the field 208 will be. Accordingly, the user may select whether the field will be a "text" field, a "name" field, an "email" field, or a "company" field, among other things.

In some embodiments, in response to receiving an indication that the user has selected a particular field type at the text block/window 212, particular embodiments automatically cause a change in the indicia of the field 208 to indicate field type selected by the user. For example, as illustrated in the screenshot 200, in response to receiving an indication that the user has selected a "company" field at the text block/window 212, particular embodiments automatically change the "Enter text" indicia within the field 208 to "Enter Company." Subsequent to this change, particular embodiments can receive an additional natural language partial string 216 to the right of the field 208 indicative of the user continuing input to complete the partial string 206. The same process can be repeated for other fields that need to be made. For example, after inputting the partial string 216, embodiments can receive an indication that the user has requested to input another field 216 (e.g., an address field) next to the partial string 216. Such process may continue for different parts of the agreement.

Figure 3:
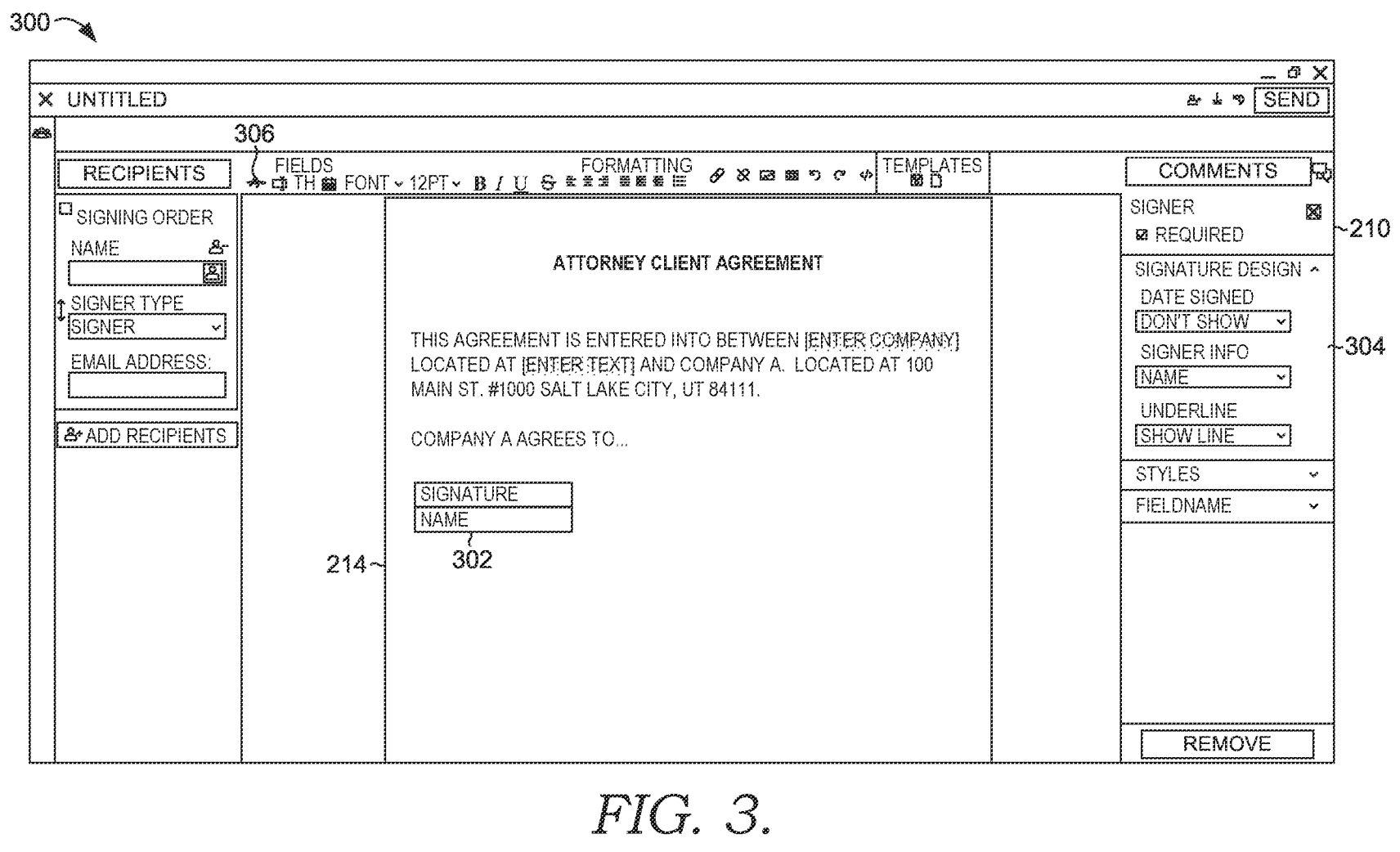

FIG. 3 is a screenshot 300 of an example user interface that illustrates how signature fields are generated, according to some embodiments. A signature field is a field that requires a signature (e.g., a name or initials) of a user. In some embodiments, the signature field module 106 produces the functionality associated with the screenshot 300. In some embodiments, the document 214 at the screenshot 300 represents the same document as the document 214 of the screenshot 200, except the user has input more content, as illustrated in FIG. 3.

In response to receiving an indication that a user has selected the signature button 306, various embodiments automatically map or associate the signature field 302 (e.g., in a more compressed form) to a user selection mechanism such that the signature field can be dragged to a desired location at the document 214, as described above. In some embodiments, as described above, in response to receiving an indication of a location of where the user wants to place the signature field 310, particular embodiments decompress the signature field 302 such that it expands to become what is illustrated in the screenshot 300.

In some embodiments, in response to receiving an indication that the user has selected the signature field 302 or any other user interface element, a signature design window 304 is generated. This allows embodiments to receive various user input corresponding to different attributes of a signature. As illustrated in the signature design window 304, embodiments can: receive an indication of whether users desire to display a date in the date field and at what position ("date signed"), receive an indication of the type of signer information to display ("signer info."), receive an indication of whether to show or position a signature line ("underline"), what particular style (e.g., typeface or font) the characters of the signature field 302 should be, and what the appropriate name of the signature field 302 should be.

In an illustrative example, in response to receiving an indication that the user has selected a drop down UI element associated with the "date signed" indicia of the window 304, particular embodiments can cause a drop down list of options, such as "to the right" (e.g., place "date" indicia to the right of the name or signature), "don't show," "above" (e.g., place the "date" indicia above the name or signature). Responsive to receiving an indication of which option the user has selected, particular embodiments cause the "date" indicia to be placed in the position indicated by the user.

In another example, in response to receiving an indication that the user has selected a drop-down UI element associated with the "signer info" indicia of the window 304, particular embodiments can cause a drop down list of options, such as "name," "name and company," "name, title, and company," and "none." As illustrated, the indicia "name" is currently under the signature indicia at the signature field 302. However, any one of these indicia options can be placed here according to these options, such as "name and company." Responsive to receiving an indication of the option selected by the user, particular embodiments cause the corresponding indicia to be placed in the position indicated by the user.

Figure 4:
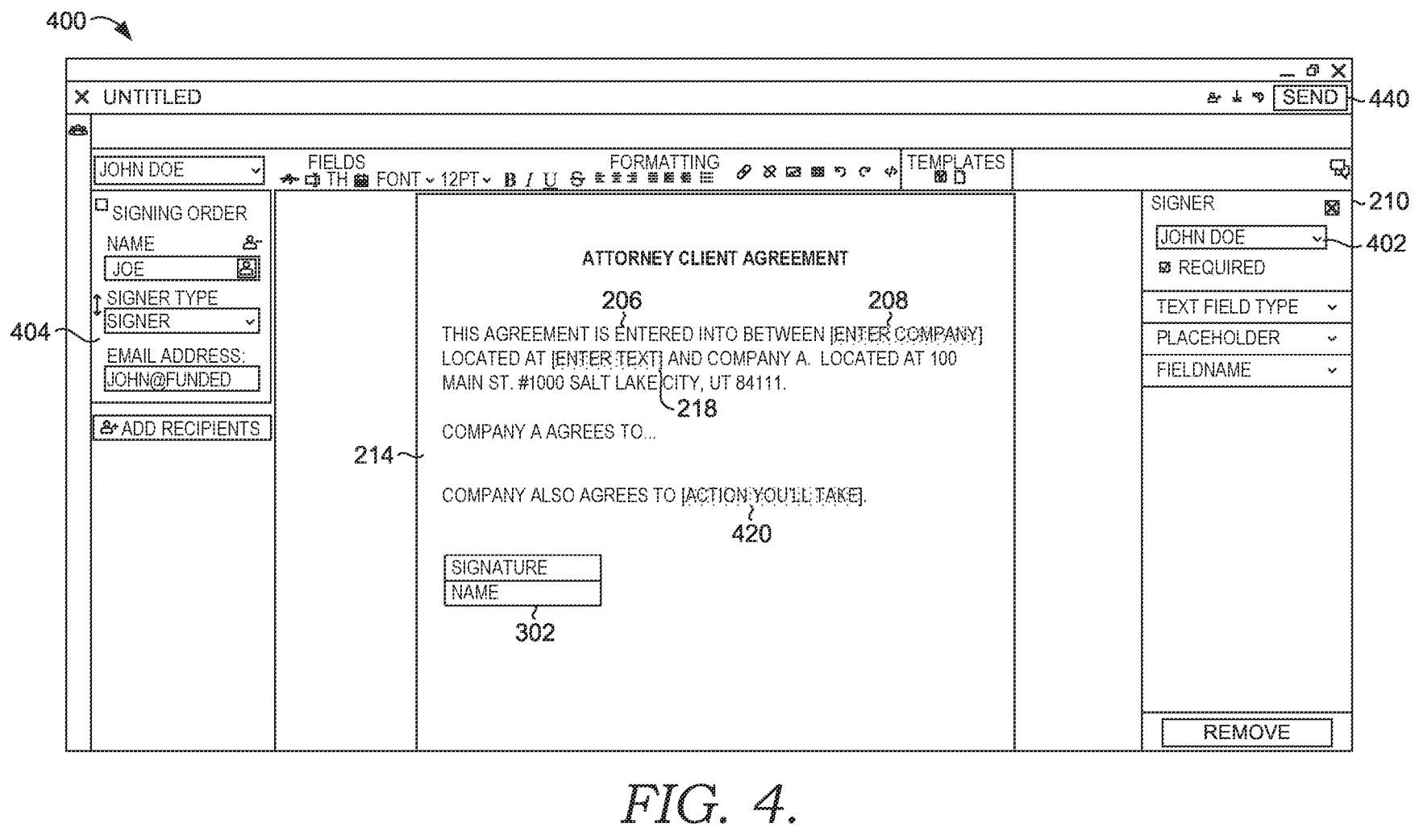

FIG. 4 is a screenshot 400 of an example user interface that illustrates how signature fields are assigned, according to some embodiments. In some embodiments, the document 214 at the screenshot 400 represents the same document as the document 214 of the screenshot 200 and/or 300, except the user has input more content, as illustrated in FIG. 4. In some embodiments, the field assignment module 108 of FIG. 1 produces the functionality associated with FIG. 4.

After a user finishes inputting the contents of the document 214 (or a portion of the document 214), including strings and fields, the user may then request that fields to be assigned to different entities so that those entities can populate the corresponding fields. Various embodiments can then assign those fields to different users according to the user request. For example, in response to receiving an indication that the user has selected the signature field 302, particular embodiments cause presentation of the windowpane 210 and/or the "signer" UI element 402 and/or the UI element 404. The user may then, for example, input the name of the signer ("John Doe") into the field 402 after selecting the name of the signer (also referred to herein as a "field assignee" "assignee" or "recipient") among a plurality of candidate signers in a drop-down list at the UI element 402. Alternative or additionally, the user may input other information associated with the signer, such as the email address or signer type at the UI element 404. Responsive to receiving an indication that the user has input the name of the signer at the UI element 402 and/or other information at the UI element 404, particular embodiments automatically assign the field 302 to the signer. In some embodiments, assigning a field includes mapping (e.g., in a data structure) the signer name to the field and implementing a trust mechanism (e.g., via PKI infrastructure or via a device ID) so that only that user is able to sign or have WRITE privileges/access to that field (e.g., and no other field). For instance, John Doe may only be assigned the field 302 but no other fields. Accordingly, various embodiments allow John Doe to only populate the field 302, but not the fields 208, 218, or 420 by incorporating a trust mechanism (e.g., based on John Doe's device fingerprint (e.g., an IP address) matching a predetermined device fingerprint of those allowed to write in the field). Each of the other fields 208, 218, and 420 may additionally or alternatively be assigned to any signer or recipient the user selects (e.g., via the UI element 402). In this way, some or each field may be associated with a particular trust mechanism so that only certain users can populate the field.

Continuing with FIG. 4, in some embodiments, in response to the assigning of one or more fields at the page 214, particular embodiments automatically transmit, over a computer network, a notification to a device associated with the signer or recipient, such as an email server or directly to a user device. Responsively, a user device of the signer may be notified to complete the populating of the assigned field, as described with respect to FIG. 5A. For example, in response to receiving an indication that the user has selected the "send" button 440, particular embodiments cause the transmission of such notification.

Figure 5A:
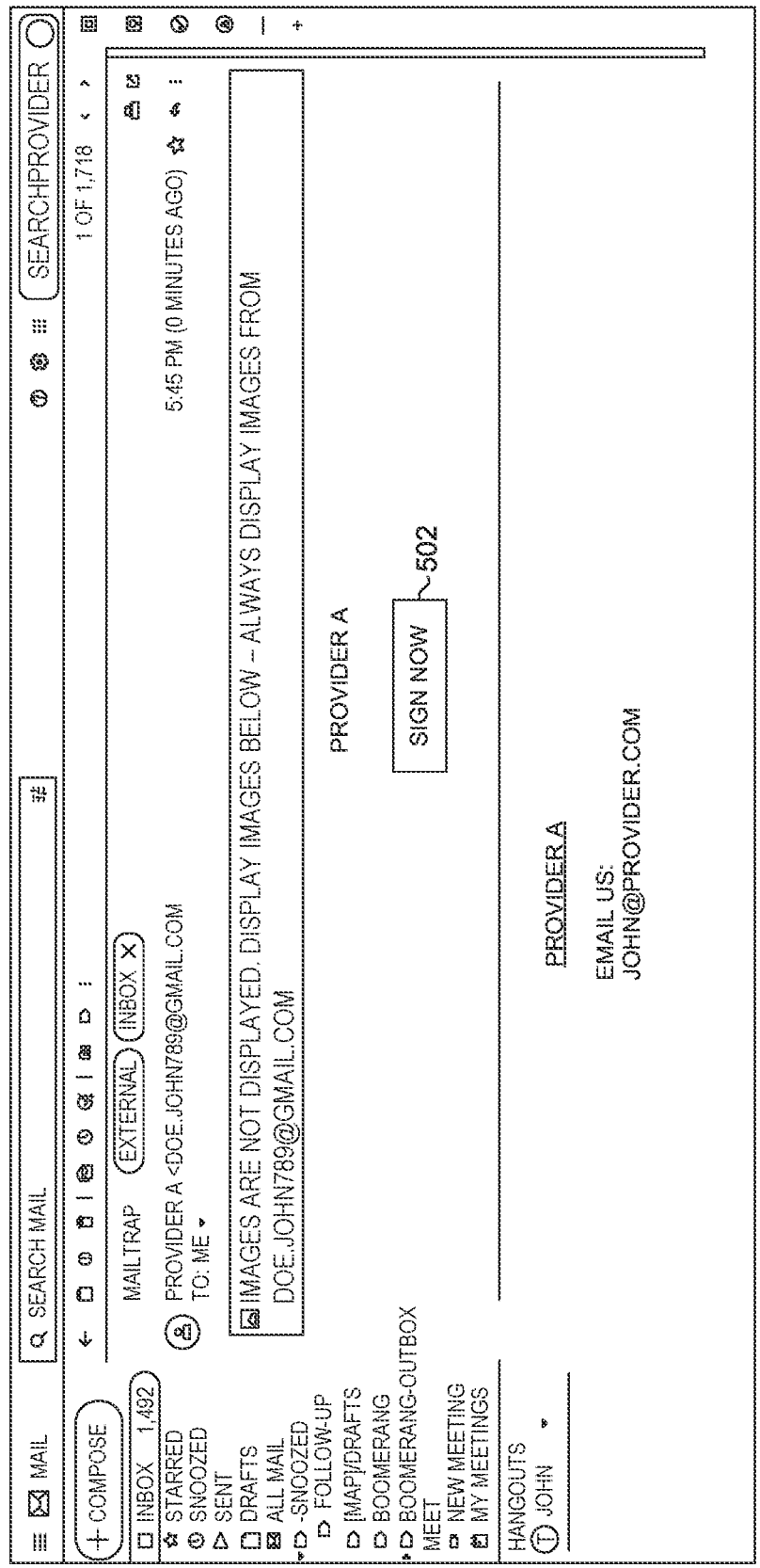
FIG. 5A is a screenshot of an example user interface that illustrates how signature fields that have been assigned to particular users are populated, according to some embodiments.

FIG. 5A is a screenshot 500 of an example user interface that illustrates how signature fields that have been assigned to particular users are populated, according to some embodiments. In some embodiments, the screenshot 500 represents what is presented to a field assignee in response to the transmission of the notification, as described with respect to FIG. 4. In some embodiments, the recipient signing module 122 of FIG. 1 produces the functionality associated with FIG. 5A (and/or FIGS. 5A through 5D).

As illustrated at FIG. 5A, the screenshot 500 represents an email page of a field assignee. In response to receiving an indication that the user has selected the "sign now" button, particular embodiments automatically cause presentation of the document 214, as illustrated in FIG. 5B. In some embodiments, such causing of the presentation of the document 215 includes an email server establishing a communication session with a web application that hosts the document 214 so that the web application can cause presentation of the document at the assignee device. FIG. 5B is a screenshot 500-2 of an example user interface illustrating WRITE access available to field assignees. For example, in response to receiving an indication that the field assignee has selected the field 302, the field may become accessible such that the user can populate the field 302 with their signature. As illustrated in FIG. 5B, each of the other fields 208, 218, and 420 have already been populated by an assignee. In some embodiments, in response to receiving an indication that the user has selected the signature field 302, other user interface elements are caused to be produced to allow the user to customize how they are signing the document, as described below with respect to FIG. 5C.

Figure 5C:
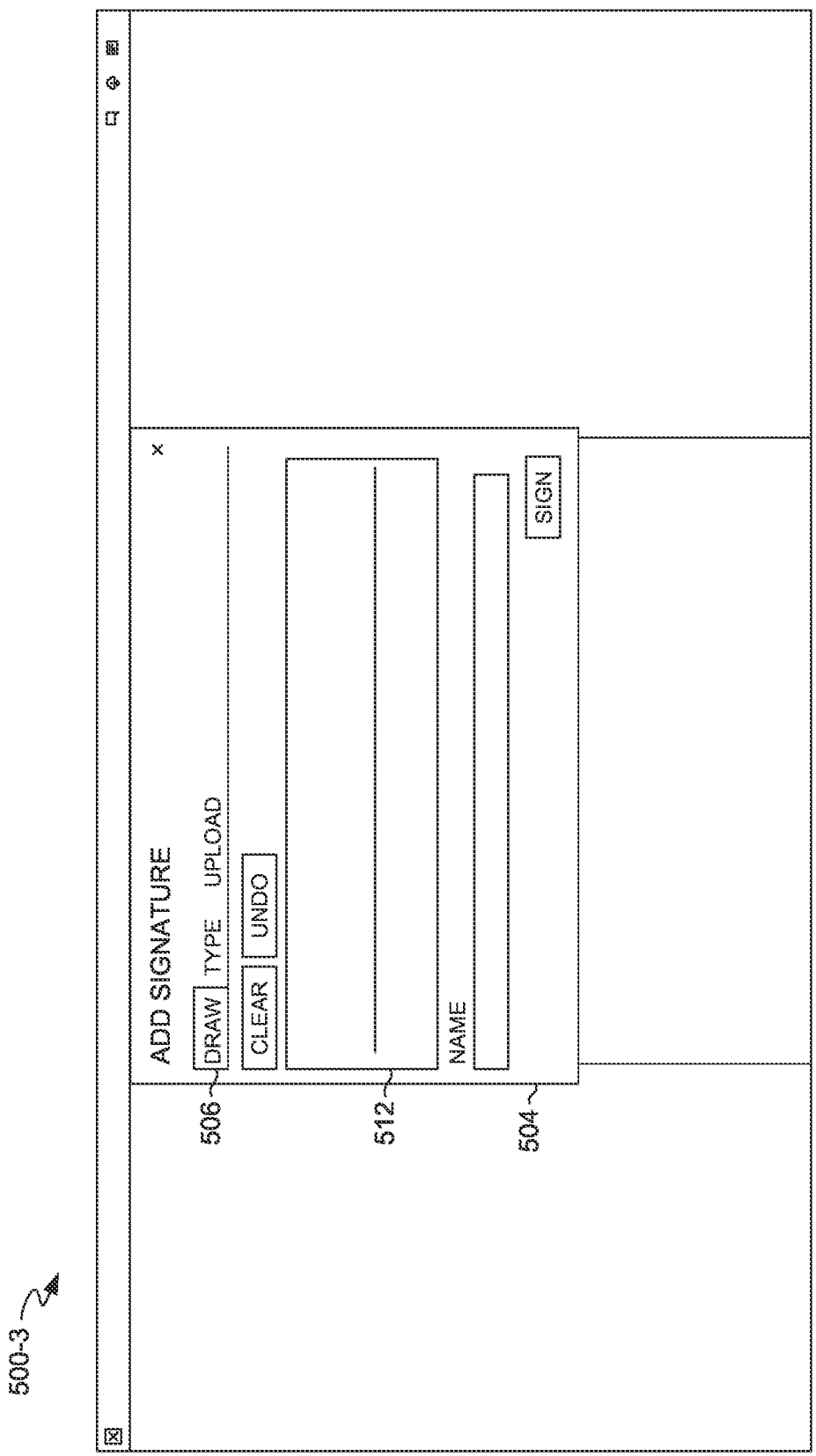
FIG. 5C is a screenshot of an example user interface illustrating that the user can manually draw or make their own signature, according to some embodiments.

FIG. 5C is a screenshot 500-3 of an example user interface illustrating that the user can manually draw or make their own signature, according to some embodiments. In some embodiments, in response to receiving an indication that the assignee user has selected the signature field 302, particular embodiments cause presentation of the window 504. In response to receiving an indication that the assignee user has selected the "draw" button 504, particular embodiments cause presentation of the blank field 502 and activate a drawing module to generate markings in response to user finger gestures or pointer movement by the user. Accordingly, the user may engage in a free-form drawing of his or her name. For example, in response to receiving an indication of a gesture movement of the user that follows each letter of a natural language name, the recipient signing module 122 may cause presentation of lines according to the gesture such that the result of the lines is a free-form name input by the user.

Figure 5D:
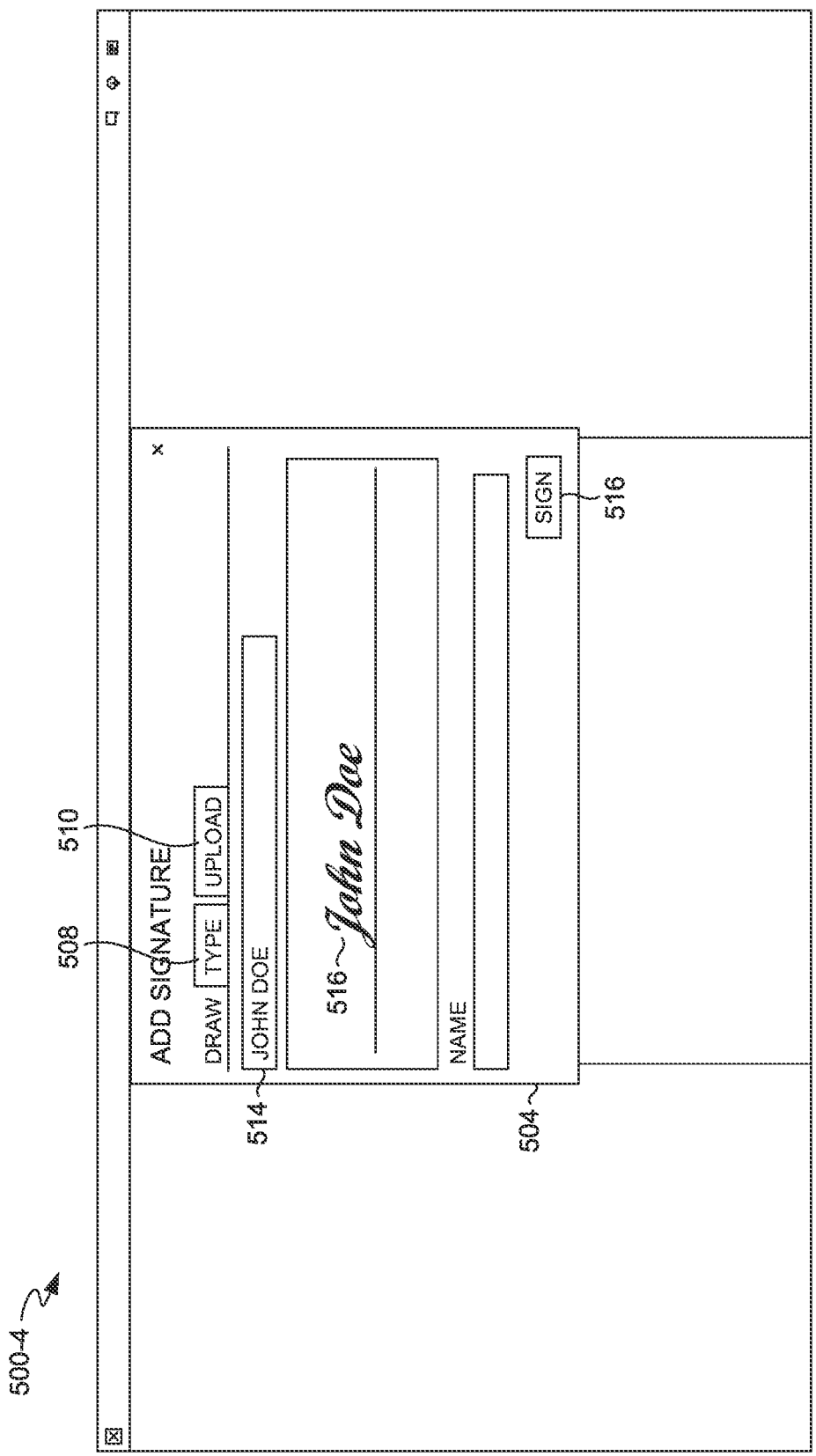
FIG. 5D is a screenshot of an example user interface illustrating that the user can type their signature, according to some embodiments.

FIG. 5D is a screenshot 500-4 of an example user interface illustrating that the user can type their signature, according to some embodiments. In response to receiving an indication that the assignee user has selected the "type" button 508, particular embodiments cause presentation of the blank field 514. Subsequently, the assignee user may then begin typing his name at the field 514. Particular embodiments automatically cause a population of the characters of the name ("John Doe") at the field 514 in response to receiving an indication that the user is inputting such characters. In some embodiments, response to receiving an indication that the user has typed one or more characters in the field 514, the recipient signing module 122 automatically causes population of the corresponding one or more characters 516, which is of a different typeface or font relative to the characters in the field 514. Such different typeface may be tailored to what the user has previously selected or otherwise selected as a default to make the signature look authentic or reflect a manually written signature.

In some embodiments, in response to receiving an indication that the user has selected the "upload" button 510, particular embodiments communicate with a user device's operating system in order to cause presentation of a dialog box or other element so that the user can upload previously saved signatures that is stored to their local computing device. In this way, the assignee user does not have to draw or type their signature but can import their already generated signature from their local device to the document 214.

Continuing with FIG. 5D, in some embodiments, in response to receiving an indication that the assignee user has selected the "sign" button 516, particular embodiments cause the user's signature to be populated at the signature field 302 at the document 214 of FIG. 4. In this way, the user's signature is placed into the field 302 according to the parameters or characters the user has input at the window 504.

Figure 6:
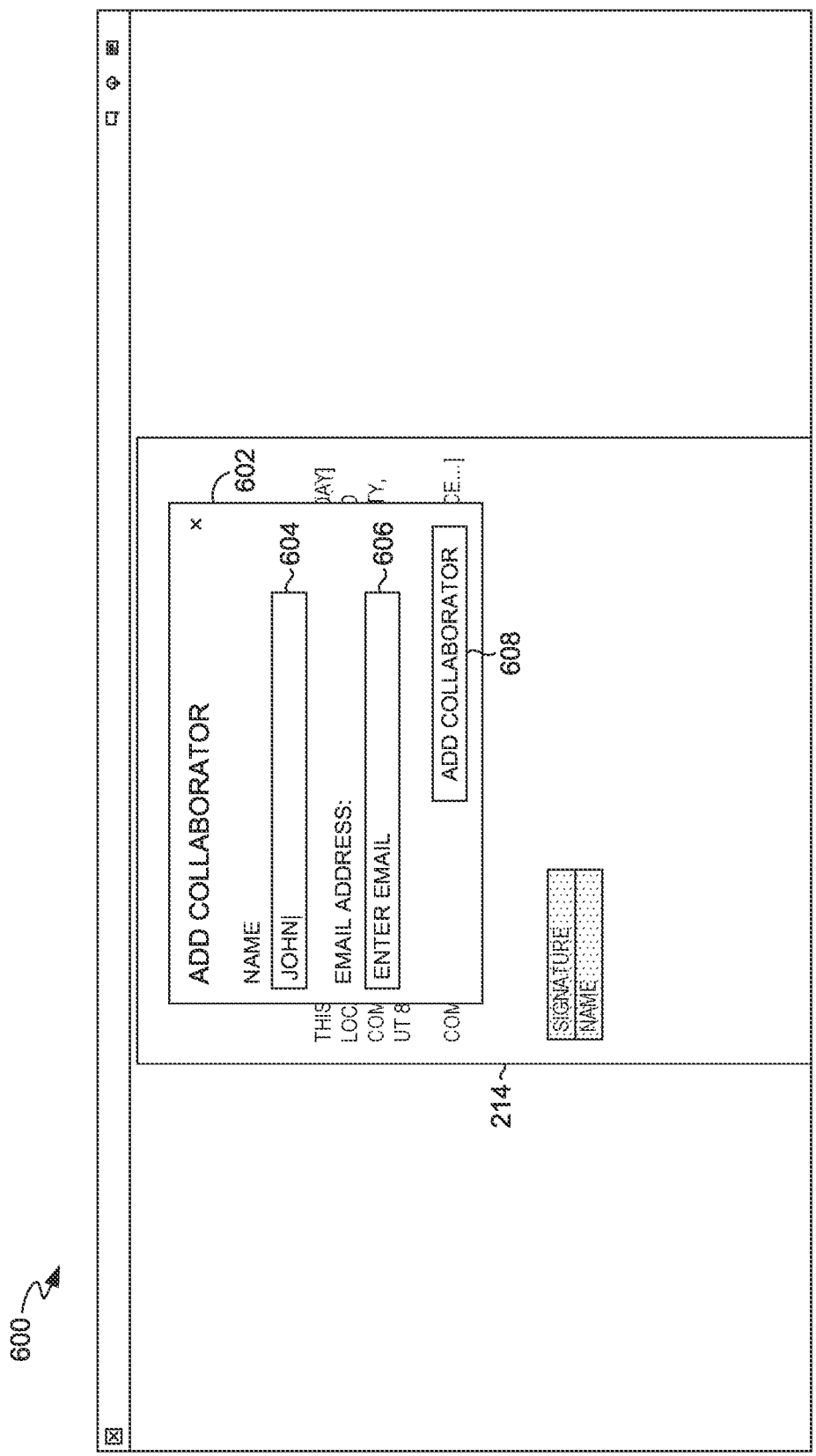
FIG. 6 is a screenshot of an example user interface illustrating user collaboration functionality, according to some embodiments.

FIG. 6 is a screenshot 600 of an example user interface illustrating user collaboration functionality, according to some embodiments. In some embodiments, the document 214 at the screenshot 600 represents the same document as the document 214 of the screenshot 200 and/or 300. In other words, for example, a document creator (e.g., not the field assignee) can add a collaborator from the same user interface page as the screenshot 200. In some embodiments, the collaboration module 112 of FIG. 1 produces the functionality associated with FIG. 6.

In response to receiving an indication that the user has selected a user interface element indicative of a request to add a collaborator, particular embodiments cause presentation of the window 602. Subsequently, the user may input the name of the collaborator at the field 604 and that collaborator's email address at the field 606. In response to receiving an indication that the user has selected the "add collaborator" button 608, particular embodiments responsively send, over a network, a notification to a device associated with the collaborator's email address so that the user is notified that they have been invited to collaborate on the document 214. Such collaboration authorization by a user to collaborate may engage a trust mechanism (e.g., KPI or device fingerprint verification) such that when the authorized user is authenticated, the user is brought to the document 214 (e.g., via establishing a communication session with a hosting web application) and granted READ and WRITE access rights. In this way, the user may change or otherwise edit the document 214. For example, some embodiments may receiving an indication that the user who has been requested for collaboration has changed the natural language string 206. Responsively, some embodiments change the characters and mark them (e.g., via red highlights) to show the changes. In some embodiments, without such collaboration request by a user, the recipient user would not be granted such READ and WRITE access rights. The document 214 may be modified accordingly to the functionality, as described with respect to the collaboration module 112 of FIG. 1.

Figure 7A:
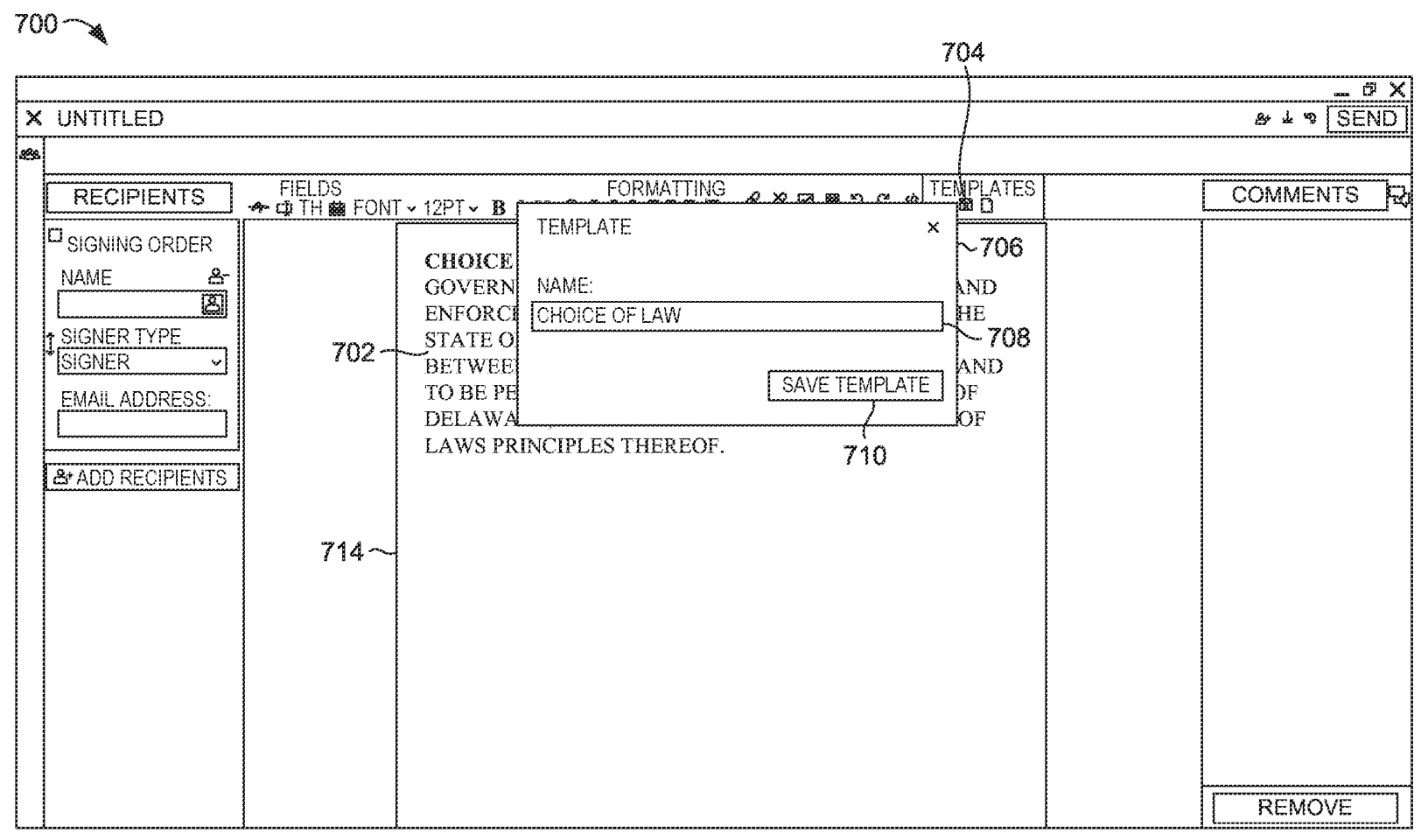

FIG. 7A is a screenshot 700 of an example user interface illustrating template generation functionality, according to some embodiments. In some embodiments, the screenshot 700 represents the same page of the screenshot 200 and/or 300, except that the user is working in a different document 714 (though the document 714 may represent the document 214 in some embodiments). In some embodiments, the template generation module 116 of FIG. 1 produces the functionality associated with FIG. 7A.

At a first time a user may input a natural language sequence, such as the "Choice of Law" provision 702. Subsequently, particular embodiments may receive an indication that the user has elected the templates button 709, which is indicative of a user request to save the contents of the document 714 (i.e., the Choice of Law provision 702) as a template so that the user can access the document 714 at a future time or session. In response to receiving this indication, particular embodiments cause presentation of the template window 706. Subsequently, embodiments may receive natural language characters at the field 708, which is indicative of the name of the template that the user chooses. In response to receiving an indication that the user has selected the "save template" button 710, particular embodiments cause a storing, in computer storage (e.g., the storage 105), of the template 714 so that embodiments can access the template at a later time in response to receiving a user request to access the template, as described below with respect to FIG. 8.

Figure 7B:
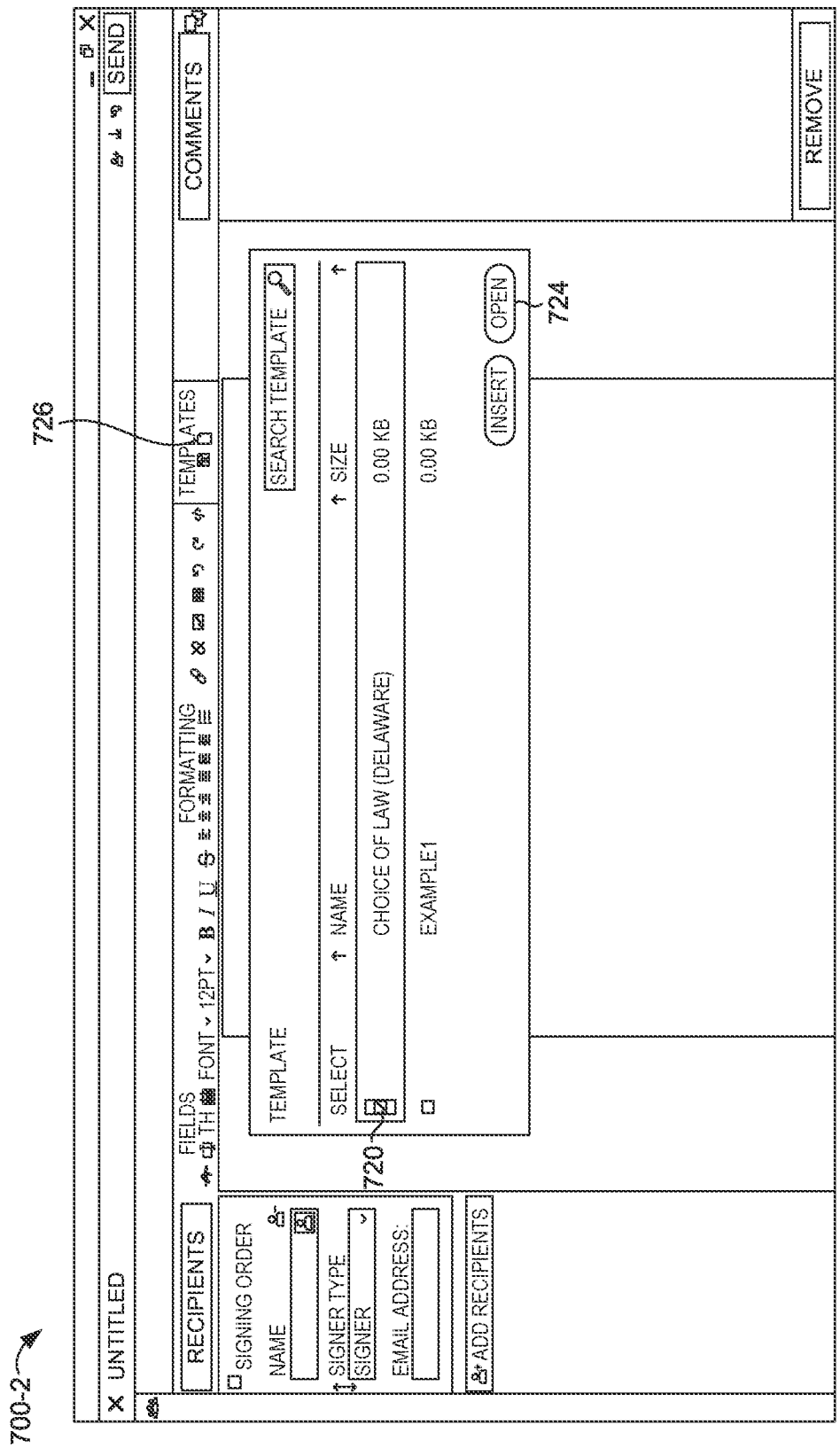
FIG. 7B is a screenshot of an example user interface illustrating how a user may access a template that has already been created, according to some embodiments.

FIG. 7B is a screenshot 700-2 of an example user interface illustrating how a user may access a template that has already been created, according to some embodiments. In some embodiments, the screenshot 700-2 represents the same page of the screenshot 200 and/or 300. In some embodiments, the template generation module 116 of FIG. 1 produces the functionality associated with FIG. 7A.

FIG. 7B illustrates that a user may access the "choice of law" template that was created at FIG. 7A. Accordingly, in some embodiments, the "choice of law" template may be generated at a prior time or session relative to the time or session associated with FIG. 7B. In response to receiving an indication that a user has selected the template button 726, particular embodiments cause presentation of the window 720, which allows the user to access the choice of law template, (among other templates) that was previously created. In response to receiving an indication that the user has selected the open button 724, some embodiments cause presentation of the document 714, along with the choice of law indicia 702, as described with respect to FIG. 7A.

Figure 8A:
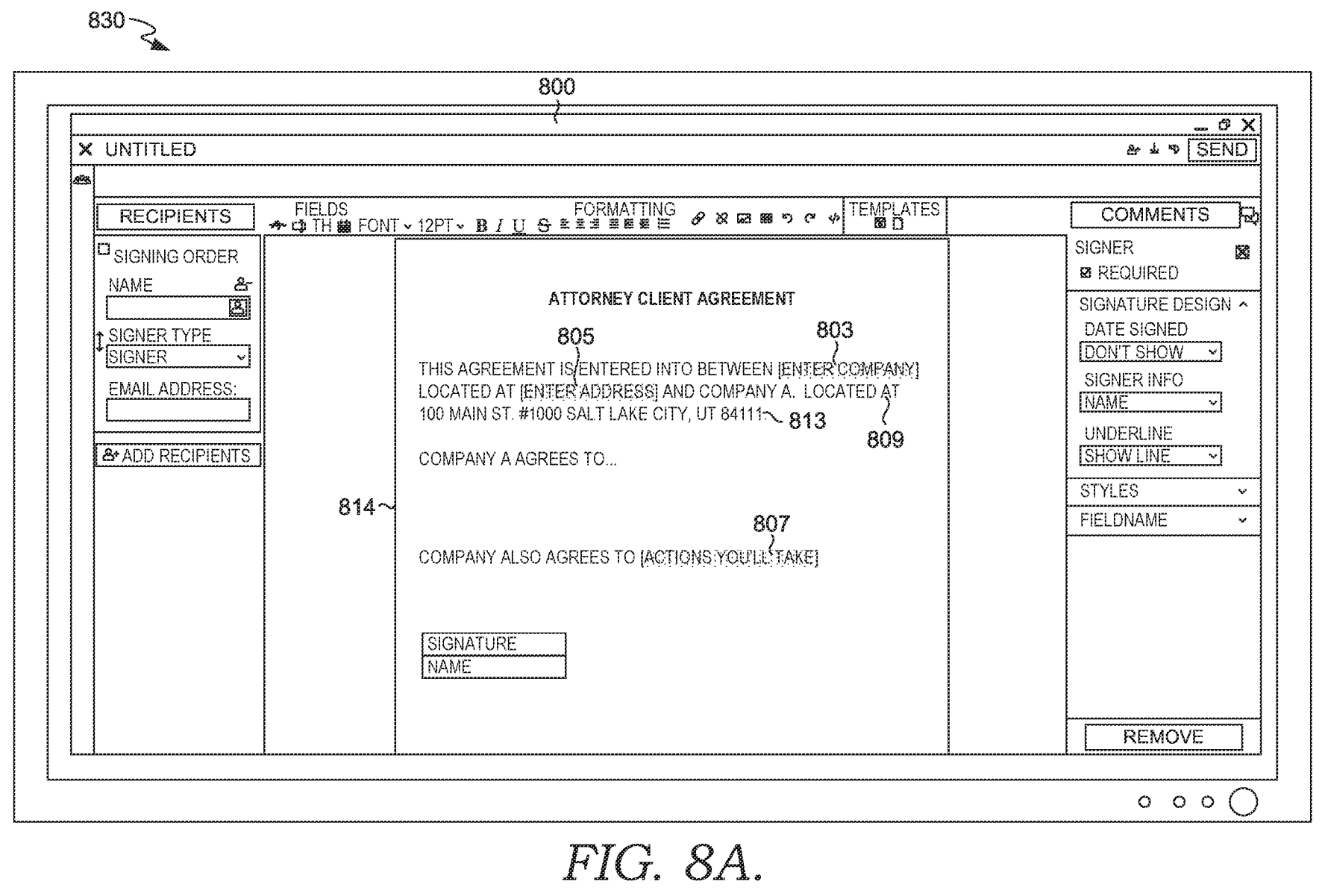
Figure 8B:
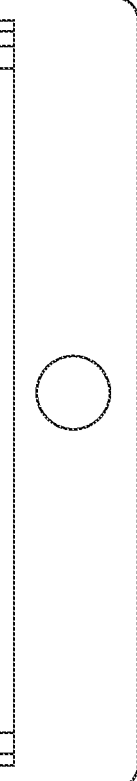
FIG. 8B illustrates a computing device that is displaying a mobile responsive screenshot of the same document as FIG. 8A, according to some embodiments.

FIG. 8A illustrates a computing device 830 that is displaying a mobile responsive screenshot 800, according to some embodiments. In some embodiments, the device responsive display module 120 is responsible for producing the functionality corresponding to FIG. 8A through 8C. In some embodiments, such computing device 830 may be a desktop, laptop or other device with a larger screen relative to FIGS. 8B and 8C.

As illustrated at the screenshot 800, the fields 803 and 805 are located on the first top line of the document 814 and the word "at" 809 is the last word on the first top line. Likewise, the number 299 is the first character of the second line (assuming a left-to-right read) and the last character on the second line is 411. As described herein, various embodiments reformat documents according at least to a device screen size, such as by wrapping text, changing positions of fields, moving characters to different lines, as described in FIGS. 8B through 8C below.

FIG. 8B illustrates a computing device 840 that is displaying a mobile responsive screenshot 800-2 of the same document as FIG. 8A, according to some embodiments. In some embodiments, such computing device 840 may be a touch pad, tablet, or other device with a smaller screen relative to FIG. 8A. As illustrated at the screenshot 800-2, only the field 803 is located on the first top line of the document 814 and the word "at" 809 has wrapped around (from the first line in FIG. 8A) to the second line at the document 814. Likewise, the number 299 is no longer the first character of the second line but rather the field 805 is the first character on the second line. The last character on the second line is 1300, as opposed to 411.

Figure 8C:
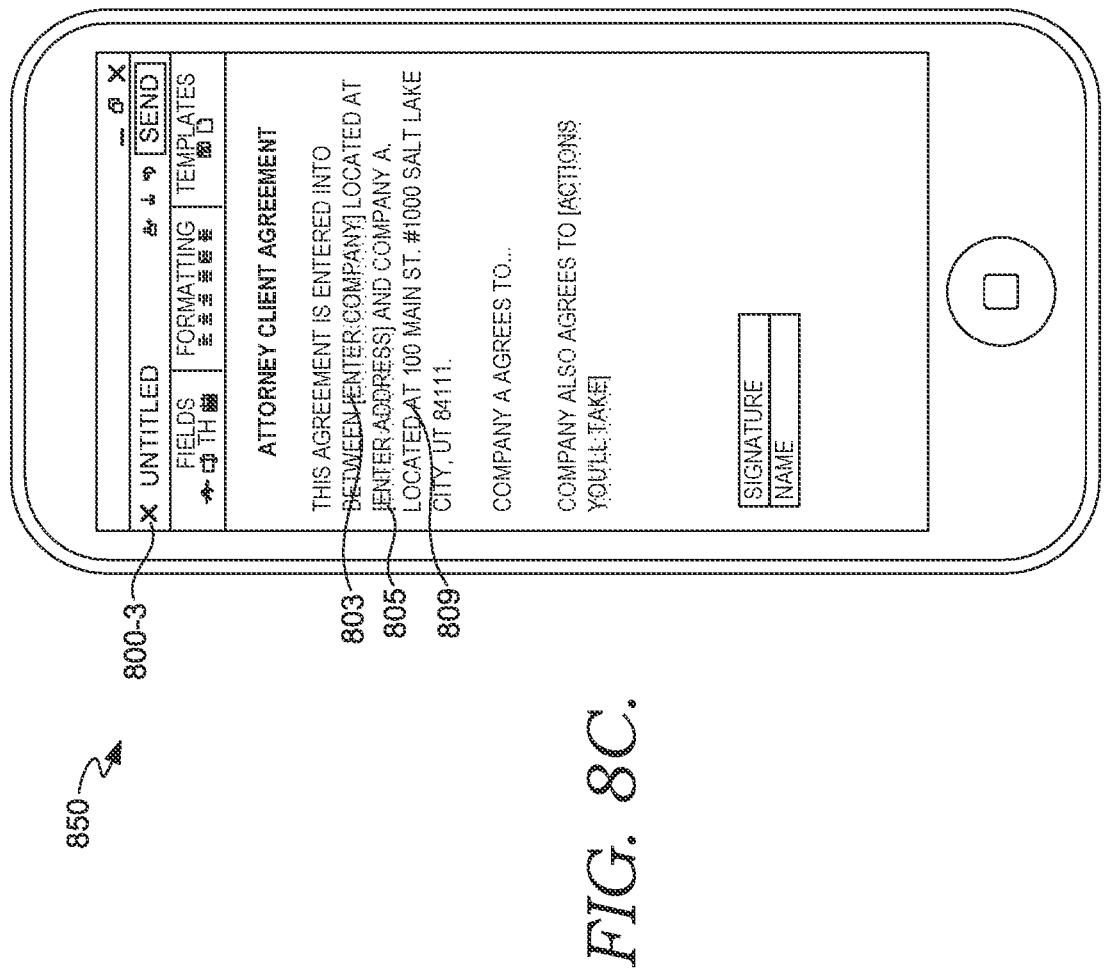
FIG. 8C illustrates a mobile device that is displaying a mobile responsive screenshot of the same document as FIG. 8A and FIG. 8B, according to some embodiments.

FIG. 8C illustrates a mobile device 840 that is displaying a mobile responsive screenshot 800-3 of the same document as FIG. 8A and FIG. 8B, according to some embodiments. In some embodiments, such mobile device 840 may be a mobile phone, smartwatch, or other device with a smaller screen relative to FIG. 8B. As illustrated at the screenshot 800-3, the field 803 is now the last item on the first line of the document 814 and the word "at" 809 has changed positions from the middle of the second line to the end of the second line at the document 814. Likewise, the number 299 starts the third line of the document 814.

Accordingly, as illustrated in FIGS. 8A through 8C, various natural language characters and fields have changed lines or positions at the document 814 as screen size becomes smaller. Each device 830, 840, and 850 may each represent different users or devices that have requested the same document 814, the contents of which have changed to be mobile responsive.

In some embodiments, such changing of position occur based on a set of rules. For example, as the screen size becomes smaller, the text (including fields) may wrap uniformly by a factor of X (a particular margin value) from top to bottom and left to right position, as illustrated in FIGS. 8A through 8C. In another example, when the screen size is smaller than a threshold, a signature field or other field may change positions, such as by skipping lines or making more spacing between the body of a document and the signatures. This way the user can clearly see where to sign. In another example, there may be a rule to never substantially stack fields (e.g., visually align one field over another) so that the user can easily distinguish the fields. In these embodiments, there may be rule to incorporate a predetermined visual distance offset so that the fields are no longer aligned. For example, if the fields 803 and 805 were stacked or vertically aligned, particular embodiments may move the field 803 (or its corresponding text) to the right at a particular grid distance. In yet another example, as the screen size becomes smaller, some embodiments may enlarge certain information, such as signature fields, which indicate the importance or relevance of those fields relative to other fields. In yet another example, one rule may be to stack signature line and a date as the screen becomes smaller. Accordingly, at a first time, a signature line and date block may be on one line. Based on a screen size being under a threshold, the signature line and date block may be split up into two lines.

As described herein, in some embodiments, the device responsive display module 120 includes components, such as HTML, CSS, media queries, fluid layouts, flexbox layouts to make it possible for documents to become mobile responsive, as illustrated by the document 814 of FIG. 8A through 8C.

In some embodiments, HTML and CSS control the content and layout of a document in any given web browser. In some embodiments, HTML controls the structure, elements, and content of a webpage. Various embodiments control primary attributes, such as height and width within HTML. Alternatively, in some embodiments, CSS is used to edit the design and layout of the elements included at a document with HTML. CSS code can be included in a <style> section of a HTML document, or as a separate stylesheet file. For example, the width of all HTML documents can be edited at the element level.

A media query is a fundamental part of CSS3 that lets embodiments render content to adapt to different factors like screen size or resolution. It works in a similar way to an "if clause" in some programming languages, basically checking if a screen's viewport is wide enough or too wide before executing the appropriate code. To work with media queries, some embodiments determine the "responsive breakpoints" or screen size breakpoints. A breakpoint is a width of the screen where a media query is used to implement new CSS styles. For example, if the screen is at least 780 pixels wide, "full-width-img" class images may take up 90% of the screen and be automatically centered by equally wide margins.

A fluid layout relies instead on dynamic values like a percentage of the viewport width. This approach will dynamically increase or decrease the different container element sizes based on the size of the screen. Flexbox is a CSS module designed as a different way to lay out multiple elements, even when the size of the contents inside the container is unknown. A flex container expands items to fill available free space or shrinks them to prevent overflow. Such flex container has a number of unique properties, like justify-content.

Figure 9:
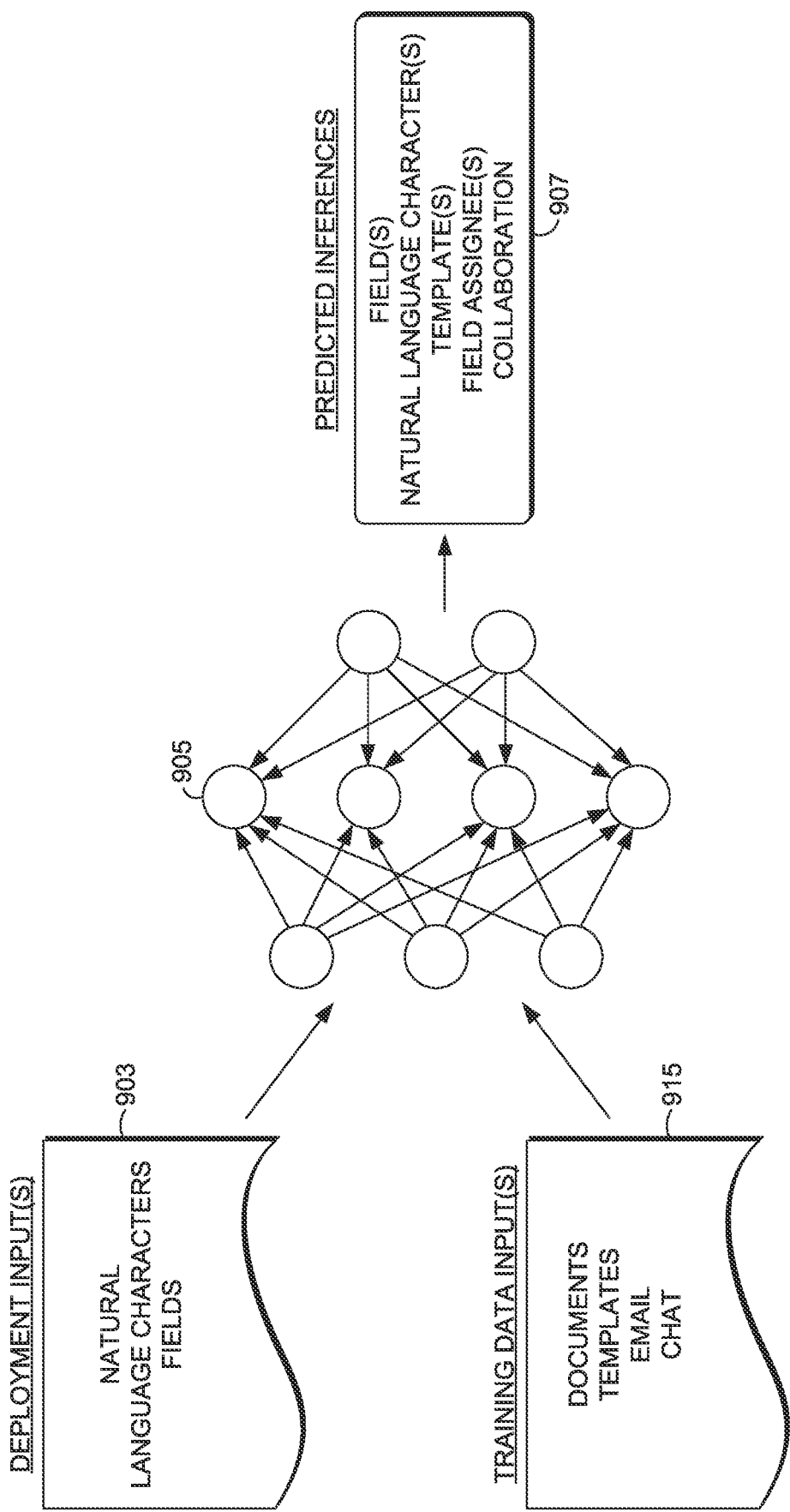
FIG. 9 is a schematic diagram illustrating the potential inputs fed to a neural network (or other machine learning models) to generate predicted inferences, according to some embodiments.

FIG. 9 is a schematic diagram illustrating the potential inputs fed to a neural network (or other machine learning models) to generate predicted inferences, in accordance with embodiments of the present disclosure. In one or more embodiments, a neural network 905 represents or includes at least some of the functionality as described with respect to the document element prediction module 124 of FIG. 1.

In various embodiments, the neural network 905 is trained using one or more data sets of the training data input(s) 915 in order to make inferences or predictions (e.g., 907) later at deployment time via the deployment input(s) 903. In one or more embodiments, learning or training can include minimizing a loss function between the target variable (e.g., a correct field) and the actual predicted variable (e.g., the predicted field at a first training epoch). Based on the loss determined by a loss function (e.g., Mean Squared Error Loss (MSEL), cross-entropy loss, etc.), the loss function learns to reduce the error in prediction over multiple epochs or training sessions so that the neural network 905 learns which features and weights are indicative of the correct inferences, given the inputs. Accordingly, it may be desirable to arrive as close to 100% confidence in a particular classification or inference as possible so as to reduce the prediction error. In an illustrative example, the neural network 905 can learn over several epochs that for a given document, template, or natural language character set as indicated in the training data input(s) 915, the likely or predicted field, natural language character sequence, template, field assignee, or the like that a user will engage in will be a particular value.

Subsequent to a first round/epoch of training (e.g., processing the "training data input(s)" 915), the neural network 905 may make predictions, which may or may not be at acceptable loss function levels. For example, the neural network 905 may process a particular set of partial strings in the training data input(s) 915. Subsequently, the neural network 905 may infer that the next element to place next to the partial string will be a particular field (e.g., a "name" field). This process may then be repeated over multiple iterations or epochs until the optimal or correct predicted value(s) is learned (e.g., by maximizing rewards and minimizing losses) and/or the loss function reduces the error in prediction to acceptable levels of confidence. For example, using the illustration above, the neural network 905 may learn that the correct field is not a "name" field given a particular input sentence, but rather a "signature" field or an "address" field.

It is understood that the training data input(s) 915 and the deployment input(s) 903 are representative only. As such, there may be more or fewer inputs. Additionally, only a select subset of the inputs listed may be inputs to the neural network 905.

In one or more embodiments, the neural network 905 converts or encodes the runtime input(s) 903 and training data input(s) 915 into corresponding feature vectors in feature space (e.g., via a convolutional layer(s)). A "feature vector" (also referred to as a "vector") as described herein may include one or more real numbers, such as a series of floating values or integers (e.g., [0, 1, 0, 0]) that represent one or more other real numbers, a natural language (e.g., English) word and/or other character sequence (e.g., a symbol (e.g., @, !, #), a phrase, and/or sentence, etc.). Such natural language words and/or character sequences correspond to the set of features and are encoded or converted into corresponding feature vectors so that computers can process the corresponding extracted features. For example, embodiments can parse, tokenize, and encode each value for example, a document, template, email messages, or chat) into a one or more feature vectors.

In one or more embodiments, the neural network 905 learns, via training, parameters, or weights so that similar features are closer (e.g., via Euclidian or Cosine distance) to each other in feature space by minimizing a loss via a loss function (e.g., Triplet loss or GE2E loss). Such training occurs based on one or more of the training data input(s) 915, which are fed to the neural network 905. For example, the training data input(s) 915 can correspond to a historical document made by a user, a template saved as a user (e.g., generated by the template generation module 116), several emails of the user, and various chat messages of the user.

One or more embodiments can determine one or more feature vectors representing the input(s) 915 in vector space by aggregating (e.g., mean/median or dot product) the feature vector values to arrive at a particular point in feature space. For example, certain embodiments can formulate a dot product of the documents, templates, emails, and chat messages and then aggregate these values into a single feature vector.

In one or more embodiments, the neural network 905 learns features from the training data input(s) 915 and responsively applies weights to them during training. A "weight" in the context of machine learning may represent the importance or significance of a feature or feature value for prediction. For example, each feature may be associated with an integer or other real number where the higher the real number, the more significant the feature is for its prediction. In one or more embodiments, a weight in a neural network or other machine learning application can represent the strength of a connection between nodes or neurons from one layer (an input) to the next layer (an output). A weight of 0 may mean that the input will not change the output, whereas a weight higher than 0 changes the output. The higher the value of the input or the closer the value is to 1, the more the output will change or increase. Likewise, there can be negative weights. Negative weights may proportionately reduce the value of the output. For instance, the more the value of the input increases, the more the value of the output decreases. Negative weights may contribute to negative scores.

In another illustrative example of training, one or more embodiments learn an embedding of feature vectors based on learning (e.g., deep learning) to detect similar features between training data input(s) 915 in feature space using distance measures, such as cosine (or Euclidian) distance. For example, the training data input 915 is converted from string or other form into a vector (e.g., a set of real numbers) where each value or set of values represents the individual features (e.g., historical documents, templates, emails, or chats) in feature space. Feature space (or vector space) may include a collection of feature vectors that are each oriented or embedded in space based on an aggregate similarity of features of the feature vector. Over various training stages or epochs, certain feature characteristics for each target prediction can be learned or weighted. For example, for a set of documents in the training input(s) 315 created by a user at, the neural network 905 can learn that particular fields are consistently associated with or included in particular documents or specific natural language characters. For example, over 90% of the time, when a natural language sequence, "this agreement is between . . . " is input at a document, then the next character is a "parties" field, which indicates that given this partial string, a "parties" field is always placed next to it. Consequently, this pattern can be weighted (e.g., a node connection is strengthened to a value close to 1, whereas other node connections (e.g., representing other fields) are weakened to a value closer to 0). In this way, embodiments learn weights corresponding to different features such that similar features found in inputs contribute positively for predictions.

In some embodiments, such training is supervised using annotations or labels. Alternatively or additionally, in some embodiments, such training is not-supervised using annotations or labels but can, for example, include clustering different unknown clusters of data points together. In an illustrative example of supervised learning, each document may be labeled with question-answer (QA) pairs (described more below) or other pairs that indicate that the data sets belong to each other. For example, a sentence " . . . the parties are located at . . . " in a document may be labeled as a question and the indicia "enter address" (indicative of an address field) may be labeled as the answer or correct prediction for the sentence. In other words, the documents with these labeled pairs represent the ground truth (e.g., the target variable) for predictions in order to derive and assess loss via a loss function. In this way, for example, whenever a user inputs the phrase "the parties are located at," particular embodiments aim to reduce loss such that these embodiments predict that the field that belongs to this sentence (i.e., the one the user will place next to this sentence) is an "address" field based on what the model derives from the ground truth.

In one or more embodiments, subsequent to the neural network 905 training, the machine learning model(s) 905 (e.g., in a deployed state) receives one or more of the deployment input(s) 303. When a machine learning model is deployed, it has typically been trained, tested, and packaged so that it can process data it has never processed. Responsively, in one or more embodiments, the deployment input(s) 903 are automatically converted to one or more feature vectors and mapped in the same feature space as vector(s) representing the training data input(s) 915 and/or training predictions). Responsively, one or more embodiments determine a distance (e.g., a Euclidian distance) between the one or more feature vectors and other vectors representing the training data input(s) 915 or predictions, which is used to generate one or more of the predicted inferences 907.

For example, using the illustrative example above, if the deployment input(s) 903 include the natural language partial string of, "this agreement is between . . . ", then the neural network 905 may predict that a "parties" field (or other natural language character set) is to be placed next to this string based on training where this was deemed to be an acceptable prediction (e.g., within a loss threshold) for this particular input according to the ground truth. Therefore, because the neural network 905 has already learned that particular field is a "parties" field given this specific partial string at training time, it makes the same prediction at deployment time. In certain embodiments, the predicted inference(s) 907 may either be hard (e.g., membership of a class is a binary "yes" or "no") or soft (e.g., there is a probability or likelihood attached to the labels). Alternatively or additionally, transfer learning may occur. Transfer learning is the concept of re-utilizing a pre-trained model for a new related problem (e.g., a new video encoder, new feedback, etc.).

As illustrated by the deployment input(s) 903, the training data input(s) 915, and the predicted inferences, there may be any suitable combination of predictions and data to process. For example, per the training data input(s) 915, the neural network 905 may train on a user's email, chat, document, and/or template history to learn particular weights or features of the inputs. In this way, when the same (or other) user inputs natural language characters or fields per the deployment input(s) 903, the neural network 905 can make specific predictions per 907, given the training. For example, given the natural language character inputs (e.g., a user types a sentence) or field (e.g., a user inputs a field), the neural network 905 may automatically predict: the next field to be incorporated in a document, the next set of natural language characters the user will input (e.g., which may also be based on NLP models), the templates the user needs, the assignee or recipient of the particular field, and/or whether the user will collaborate on a document (e.g., based on chats or emails that state, in natural language, that a particular user will send out a document for other users to collaborate on).

Figure 10:
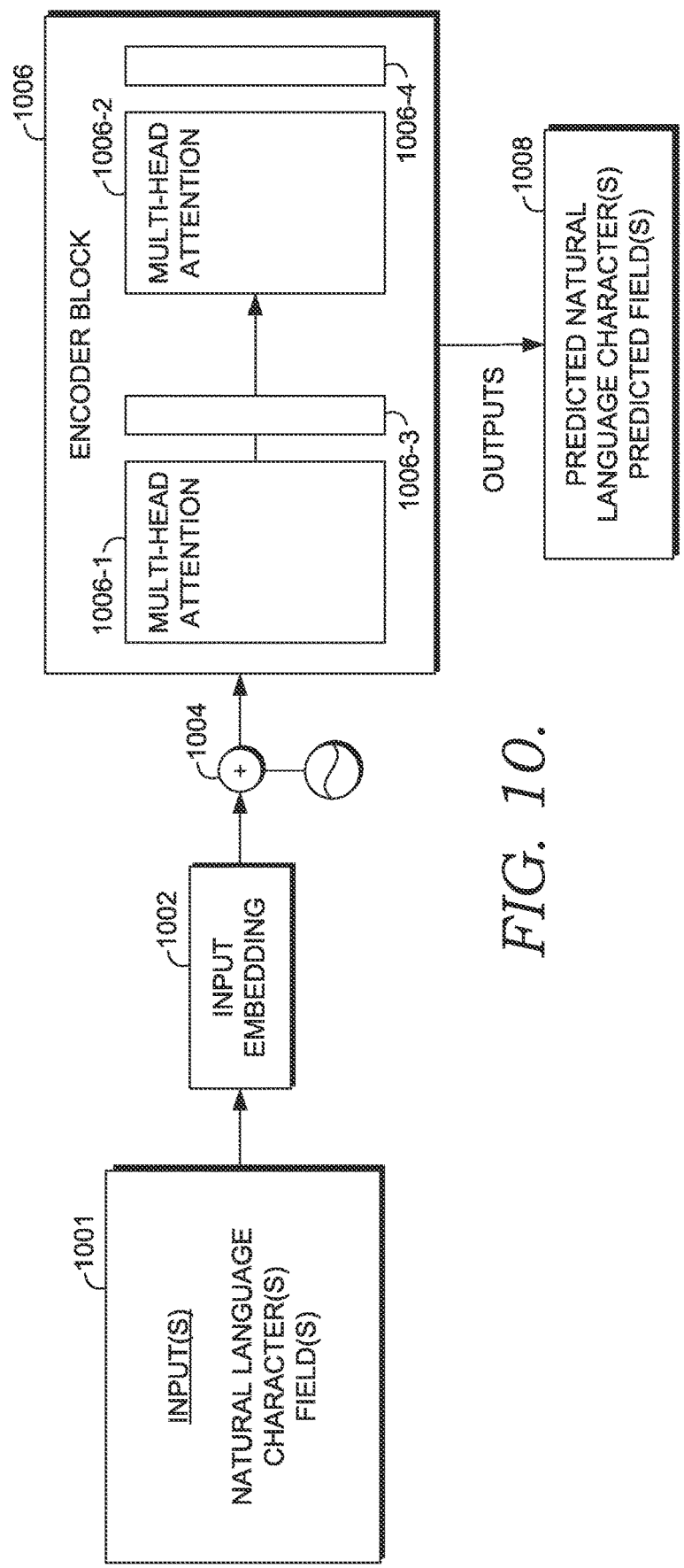
FIG. 10 is a block diagram of a modified BERT model or encoder that uses particular inputs to predict particular natural language characters and/or fields that a user will input, according to some embodiments.

FIG. 10 is a block diagram of a modified BERT model or encoder that uses particular inputs to predict particular natural language characters and/or fields that a user will input, according to some embodiments. In some embodiments, this model represents or includes the neural network 905 of FIG. 9. In some embodiments, this model is a part of or included in the document element prediction module 124 of FIG. 1. First, one or more of the inputs 1001 are converted into feature vectors and embedded into an input embedding 1002 to derive meaning of an individual word. In some embodiments, the input(s) 1001 represent characters and fields included in historical documents that a user has created. In some embodiments, the input(s) 1001 alternatively include or represent the deployment input(s) 903 and/or the training data input(s) 915 of FIG. 9. In some embodiments, each word in the input(s) 1001 is mapped into the input embedding 402 in parallel or at the same time, unlike existing LSTM models, for example.

The input embedding 1002 maps a word to a feature vector representing the word. But the same word (e.g., "apple") in different sentences may have different meanings (e.g., phone v. fruit). This is why a positional encoder 1004 can be implemented. A positional encoder is a vector that gives context to words (e.g., "apple") based on a position of a word in a sentence. For example, with respect to a message "I just sent the document," because "I" is at the beginning of a sentence, embodiments can indicate a position in an embedding closer to "just," as opposed to "document." Some embodiments use a sign/cosine function to generate the positional encoder vector as follows:

$$PE_{(pos,2i)}=\sin(pos/10000^{2i/d_{model}})$$

$$PE_{(pos,2i+1)}=\cos(pos/10000^{2i/d_{model}})$$

After passing the input(s) 1001 through the input embedding 1002 and applying the positional encoder 1004, the output is a word embedding feature vector, which encodes positional information or context based on the positional encoder 1004. These word embedding feature vectors are then passed to the encoder block 1006, where it goes through a multi-head attention layer 1006-1 and a feedforward layer 1006-2. The multi-head attention layer 1006-1 is generally responsible for focusing or processing certain parts of the feature vectors representing specific portions of the input(s) 1001 by generating attention vectors. For example, in Question Answering systems, the multi-head attention layer 1006-1 determines how relevant the $i^{th}$ word (or particular word in a block) is for answering the question or relevant to other words in the same or other blocks, the output of which is an attention vector. For every word, some embodiments generate an attention vector, which captures contextual relationships between other words in the same sentence, block, and or line. For a given word, some embodiments compute a weighted average or otherwise aggregate attention vectors of other words that contain the given word (e.g., other words in the same line or block) to compute a final attention vector.

In some embodiments, a single headed attention has abstract vectors Q, K, and V that extract different components of a particular word. These are used to compute the attention vectors for every word, using the following formula:

$$Z = \mathrm{softmax}\left(\frac{Q \cdot K^T}{\sqrt{\text{Dimension of vector } Q, K \text{ or } V}}\right) \cdot V$$

For multi-headed attention, there a multiple weight matrices $W^q$, $W^k$ and $W^v$. so there are multiple attention vectors Z for every word. However, a neural network may only expect one attention vector per word. Accordingly, another weighted matrix, $W^z$, is used to make sure the output is still an attention vector per word. In some embodiments, after the layers 1006-1 and 1006-2, there is some form of normalization (e.g., batch normalization and/or layer normalization) performed to smoothen out the loss surface making it easier to optimize while using larger learning rates.

Layers 1006-3 and 1006-4 represent residual connection and/or normalization layers where normalization re-centers and re-scales or normalizes the data across the feature dimensions. The feed forward layer 1006-2 is a feed forward neural network that is applied to every one of the attention vectors outputted by the multi-head attention layer 1006-1. The feed forward layer 1006-2 transforms the attention vectors into a form that can be processed by the next encoder block or making a prediction at 1008. For example, given that a user has currently (or historically) typed a first natural language sequence "the due date is . . . " the encoder block 1006 can predict that the next natural language sequence (or field type) will be a specific date or be particular words based on past documents that include language identical or similar to the first natural language sequence.

In some embodiments, the encoder block 1006 includes pre-training and fine-tuning to learn language (pre-training) and make the predictions at 1008 (fine-tuning). In some embodiments, pre-training is performed to understand language and fine-tuning is performed to learn a specific task, such as learning an answer to a set of questions or learning the specific relationships between natural language sequences and other natural language sequences and/or fields.

In some embodiments, the encoder block 1006 learns what language and context for a word is in pre-training by training on two unsupervised tasks—MLM and NSP—simultaneously or at the same time. The encoder block 1006 takes in a sentence, block, or line (e.g., included in the input(s) 1001), with random words being replaced with masks. The goal is to output the value or meaning of the masked tokens. For example, if a line reads, "please [MASK] this document promptly," the prediction for the "mask" value is "send." This helps the encoder block 1006 understand the bidirectional context in a sentence, line, or block at a document. In the case of NSP, the encoder takes, as input, two or more elements, such as sentences, lines, or paragraphs and determines, for example, if a second line in a document actually follows (e.g., is directly below) a first line in the document. This helps the encoder block 1006 understand the context across all the elements of a document, not just within a single element. Using both of these together, the encoder block 1006 derives a good understanding of natural language.

In some embodiments, during pre-training, the input to the encoder block 1006 is a set (e.g., 2) of masked lines (lines for which there are one or more masks), which could alternatively be sentences or partial strings. In some embodiments, each word is represented as a token, and some of the tokens, are masked. Each token is then converted into a word embedding (e.g., 1002). At the output side is the binary output for the next sentence prediction. For example, this component may output 1, for example, if masked line 2 followed (e.g., was directly beneath) masked block 1. The "T" values are word feature vectors that correspond to the outputs for the machine learning model functionality. Thus, the number of word feature vectors that are input is the same number of word feature vectors that are output.

In some embodiments, the initial embedding (e.g., the input embedding 1102) is constructed from three vectors— the token embeddings, the segment or context-question embeddings, and the position embeddings. In some embodiments, the following functionality occurs in the pre-training phase. The token embeddings are the pre-trained embeddings. The segment embeddings are the sentence number (that includes the input(s) 1001) that is encoded into a vector (e.g., first sentence, second sentence, etc. assuming a top-down and right-to-left approach). The position embeddings are vectors that represent the position of a particular word in such sentence that can be produced by 1004. When these three embeddings are added or concatenated together, an embedding vector is generated that is used as input into the encoder block 1006. The segment and position embeddings are used for temporal ordering since all of the vectors are fed into the encoder block 1006 simultaneously and language models need some sort of order preserved.

In pre-training, the output is typically a binary value C (for NSP) and various word vectors (for MLM). With training, a loss (e.g., cross entropy loss) is minimized. In some embodiments, all the feature vectors are of the same size and are generated simultaneously. As such, each word vector can be passed to a fully connected layered output with the same number of neurons equal to the same number of tokens in the vocabulary.

In some embodiments, the encoder block 1006 alternatively pre-trains on generic word or character sequence pairs (as opposed to merely learning language) from different data sources as done in standard BERT models. More specifically, for example, the encoder block 1006 can learn, via training, the relationship between requests and replies in natural language. In some embodiments, such request-reply functionality is expressed though Question Answering (QA) systems. In other words, the task-reply pairs can be question-answer pairs. In QA tasks, models receive a question regarding text content (e.g., "given the sentence X, what is the field to be placed here?") and mark or tag the beginning and end of the answer (e.g., "enter company name here" field) in a document.

Some embodiments are additionally responsible for fine tuning the encoder block 1006 after it has been pre-trained. Once pre-training is performed, the encoder block 1006 can be trained on very specific tasks, such as Question Answering, determining string pairs, and determining string-field pairs (e.g., fields that are predicted to be placed next to certain strings). For example, in Question Answering, some embodiments replace the fully connected output layers of the encoder block 1006 using in pre-training, with a fresh set of output layers that can output the answer to a given question. Subsequently, supervised training can be performed using a Question Answering dataset. Accordingly certain embodiments can change the model for fine-tuning by changing the input layer and the output layer. That is, for example, the inputs are changed from the masked line 1 and 2 tokens to a "question" and "field" that contains an answer (or candidate answer) as the tokens. In the output layer, certain embodiments output the start and end words (or characters) that encapsulates the answer. In some embodiments, such question-answer pairs are specifically labeled as completed or not completed (e.g., answered or not answered).

In an illustrative example of fine-tuning or making inferences with the encoder block 1006, some embodiments learn that the question of "what field is placed next to sentence A" (e.g., "this agreement is between . . . "), has an answer of "parties field," as indicated in the predicted field(s) of 1008. Responsively, these embodiments generate an auto-suggestion or automatically generate/cause presentation of the "parties" field next to sentence A at the document. In this way, a language model can be trained and fine-tuned not only to understand language but predict what fields or natural language characters the user will likely placed next to current natural language input that they have (or are currently) input. In some embodiments, such predictions can be in near real-time relative to the time at which users input particular characters at document based on processing the input through the language model.

Figure 11:
FIG. 11 is a screenshot of a user interface that illustrates a document where natural language texts or fields (or field types) can be auto-suggested, according to some embodiments.

FIG. 11 is a screenshot 1100 of a user interface that illustrates a document where natural language texts or fields (or field types) can be auto-suggested, according to some embodiments. In some embodiments, the field generation module 102 and/or the document element prediction module 124 of FIG. 1 produces the functionality associated with the screenshot 1100. In some embodiments, the screenshot 1100 represents the screenshot 200 of FIG. 2, except that particular fields or other natural language characters are auto-suggested rather than generated at the document 214 based on manual user input. In some embodiments, the screenshot 1100 represents functionality that is produced post machine learning model deployment, so that trained models can make inferences based on new user input data (e.g., the partial string 206).

At a first time a user may input the partial string 206 at the document 214. In response to receiving an indication that the user has input the partial string 206, some embodiments automatically predict (e.g., via the neural network 905) that the field 208 will be placed next to the partial string 206 based on learning patterns in the user's past history (e.g., learning that the field 208 has been repeatedly placed next to the same currently input partial string various other documents the user has formulated) and/or the contents of the partial string 206 itself (e.g., via NLP). Examples of such prediction is described with respect to the neural network 905 of FIG. 9, the encoder block 1006 of FIG. 10, and the document element prediction module 124 of FIG. 1.

In response to making such automatic predictions, some embodiments automatically generate and automatically cause presentation of the field 208 and/or the pop-up message 1103. The message 1103 informs that user that field 208 is a suggested field to input next to the partial string 206 based on the user's past history and/or current input. In response to receiving an indication that the user has selected the "here" link in the indicia, "please click here if this field is not correct," particular embodiments remove the field 208 from the document 214 and/or request that the user select a button (e.g., the button 204) to manually input a field. In response receiving an indication that the user has not selected "here" or otherwise accepts the field prediction, particular embodiments automatically generate or cause presentation of the field 208 at the document 214.

In response to receiving an indication that the user selected "here" (or did not make such selections), some embodiments provide this as feedback to a machine learning model so that the model can make future predictions based on the feedback (e.g., via reinforcement learning). For example, given a first partial string and a first predicted field, if a user indicates that the first field is not the correct field, particular embodiments may provide a penalty to a model such that the model is less likely to make the same prediction when the same first partial string is input at a future session. Conversely, if the user indicates that the first field is the correct field, some embodiments may provide a reward to a model such that the model is more likely to make the same prediction when the same first string is input at a future session. In reinforcement learning, models typically make predictions where they are given rewards instead of penalties.

Figure 12:
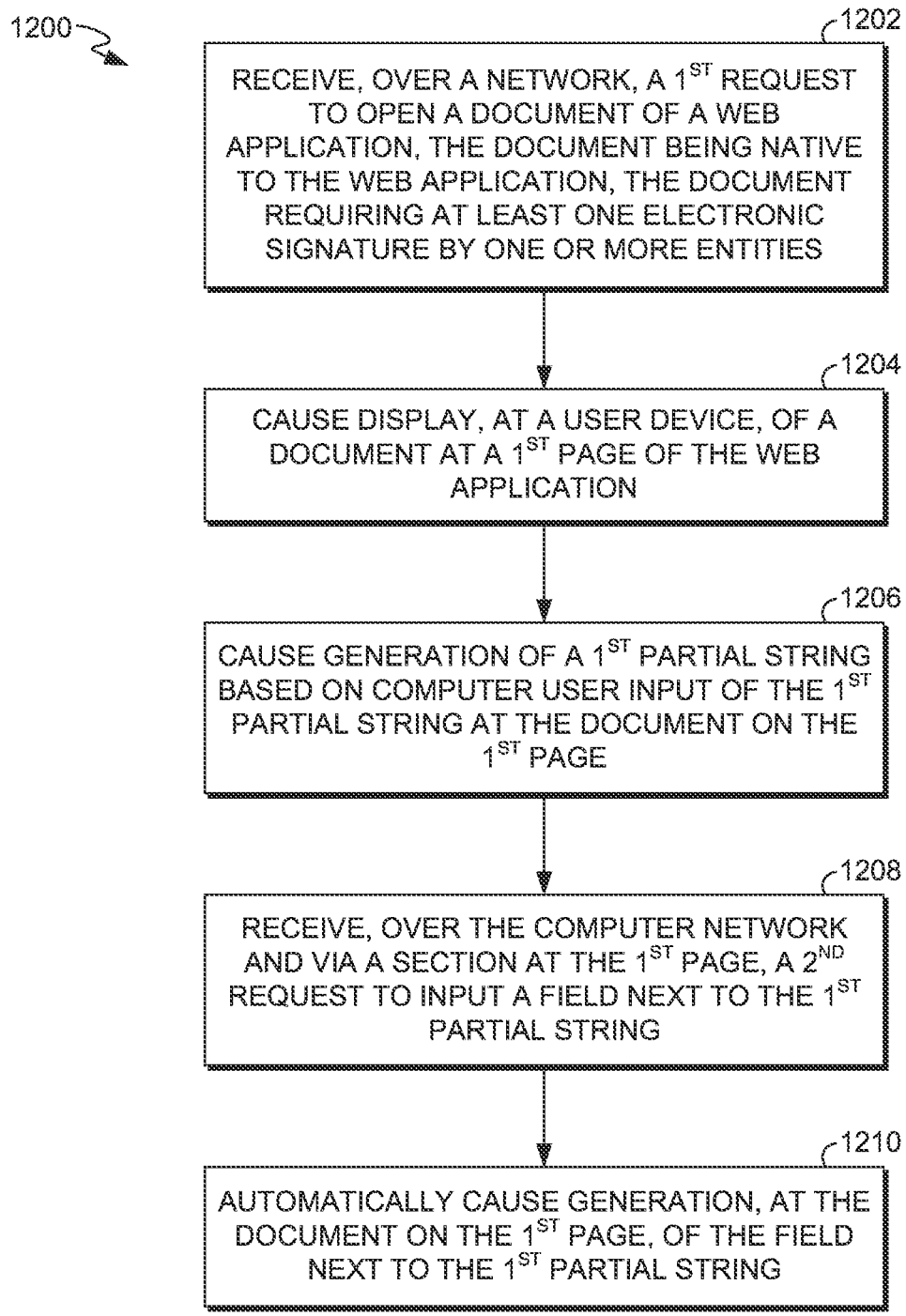
FIG. 12 is a flow diagram of an example process for causing generation of a field next to a partial string, according to some embodiments.

Turning now to FIG. 12, which is a flow diagram that depicts a process 1200 for causing generation of a field next to a partial string, according to some embodiments. Process 1200 (and/or any of the functionality described herein) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Furthermore, more (or fewer) blocks may exist than illustrated. Such added blocks may include blocks that embody any functionality described herein. The computer-implemented method, the system (that includes at least one computing device having at least one processor and at least one computer readable storage medium), and/or the computer storage media as described herein may perform or be caused to perform the processes 1200 or any other functionality described herein.

In some embodiments, the process 1200 is performed by or at a server (or set of servers), node(s) (e.g., cloud computing nodes), or other device and is thus from the perspective of the back-end. Alternatively, in some embodiments, the process 1200 is performed by or at a user device (e.g., a mobile phone), and is thus from the perspective of the front-end.

Per block 1202, particular embodiments receive, over a computer network (e.g., 110), a first request to open a document of a web application, where the document is native to the web application, and where the document requires at least one electronic signature by one or more entities. For example, a user may first open a browser application at her user device and input a URL to be taken to an electronic signature website. At the website, the user may, via the user device, then click on a button to open a document. Embodiments may then perform block 1202 to receive such indication of the click. Other examples of block 1202 are described at FIG. 2.

In some embodiments, however, the document need not be part of a "web" application, but can be part of any application, such as a mobile app, extension, plugin, or locally stored application. In this way, block 1202 may alternatively be receiving a first request to open a document of an application. As described herein a "web application" is typically accessed through a web browser or other client application with an active connection to the internet or other wide area network (WAN). A "web application" need not be limited to certain infrastructure components, such as a web server only. Rather, a web application can alternatively or additionally be associated with other infrastructure components, such as an application server.

In some embodiments, a "document" is indicative of any page (e.g., a web page), activity (e.g., screen in an Android OS), or any suitable data object that is part of an application for which users have control of inputting characters at. For example, the document can be an HTML page, an Extensible Markup Language (XML) page, an HTML5 page, a CSS page, and/or the like. An HTML document, for example, is a text document saved with the extension .html or .htm that contains texts and some tags written between "< >" which give the computer instructions needed to configure the web page. These tags are fixed and definite. HTML documents typically include two components. The first component is visible at the browser from the user perspective. From this perspective, the document is not changed directly, and the document displays the entire contents of the page for the user to see without the tags or extension. A second component contains the source code of the page with which the HTML document can be modified, which shows the tags and extension.

An "electronic signature" (e.g., an E-signature) as described herein refers to any symbol, character(s), string(s), sound, utterance, process, or any other indication in electronic form (e.g., data) that is attached to or logically associated with a document, where the electronic signature indicates execution of or adoption of document content by an entity. For example, an electronic signature may be a natural language signature of a person's name or initials. Electronic signatures typically indicate an assent to or agreement by an entity to at least a portion of the contents of a document. For example, by a person signing their name at the end of an agreement, that person agrees to all of the terms of the agreement. An "entity" as described herein refers to a person (or group of persons), a business (or group of businesses), a program (e.g., representing a person), and/or a person acting as proxy to another person.

Per block 1204, certain embodiments cause display, at a user device, of a document at a first page of the web application (or other application). For example, in response to receiving the first request, some embodiments cause display of the document at a first page of the web application, at the user device. Examples of this are described with respect to causing display of the document 214 at the page 200 of FIG. 2.

Some embodiments additionally (e.g., as part of block 1204) automatically format at least one of: the size of the document itself, a first partial string (e.g., that a user inputs) or a field at the document on the first page based at least in part on a screen size of the user device. Examples of this are described with respect to the device responsive display module 120 of FIG. 1 and FIGS. 8A through 8C.

Per block 1206, some embodiments cause generation of a first partial string based on computer user input of the first partial string at the document on the first page via the user device. In some embodiments, however, the user input need not be made at the first page but may be made on another page (or another document). A "partial string" is one or more: letters, words, numbers, phrases, and/or symbols that is not complete (e.g., a user has not input a period yet), but rather a user is to add additional strings at a later time to complete the partial string (e.g., input additional words and a period). For example, referring back to FIG. 2, partial string 206 is a partial string because this sentence is not complete, but rather the string 216 is later added to complete the sentence. However, a "partial string" need not be generated at block 1206. Rather, in some embodiments any set of characters (e.g., words, letters, symbols) whether partial or completed can be generated. Additionally, block 1206 may be indicative of receiving a set of characters, as opposed to causing generation of those characters.

Per block 1208, some embodiments receive, over the computer network and via a selection at the first page, a second request to input a field next to the first partial string. In some embodiments, however, the selection may not be made at the first page but can be made, for example, at a different page relative to the first page. Further, in some embodiments, the second request can just be a request to input the field (not necessarily a request to input it next to the partial string). In yet other embodiments, the receiving of the second request is not based on a selection at the first page via a user at the user device. Rather, in some embodiments, the receiving of the request is automatically received via the document element prediction module 124 based on a machine learning model automatically predicting the field and automatically sending the prediction to a device, such as a back-end web server or user device to automatically generate the field at block 1210.

Examples of block 1208 are described with respect to FIG. 2, where embodiments receive an indication that the user has selected the button 204 and dragged the field 208 next to the partial string 206 at the page 200. Block 1208 can occur subsequent to the receiving of the first partial string, as described with respect to FIG. 2. As described herein, a "field" is a data object corresponding to a predetermined category for which one or more users are to input data at the field according to the predetermined category. For example, a field can be a text editor record, array, entry, or any other data structure that is configured to receive user (not developer) input. Such field is associated with a "predetermined category," which may refer to or indicate a class, type, or identifier (ID) of the particular field. It may be "predetermined" because the category may have been developed as part of the web application (or other application) at build time. In an illustrative example, referring back to FIG. 2, the predetermined category can be set by users at the UI element 212 (e.g., a "signature" field), which have all been predetermined or developed as part of the web application.

In some embodiments, the field (or the predetermined category or field type) is one of a group of fields, such as a signature field, a company name field, a personal name field, an email address field, a job title field, or a residential/business address field. A "signature" field is a field that is configured to receive a user's electronic signature and/or include other indicia in the field, such as "put signature here." The "company name" field is a field that is configured to receive the name of a business entity, such as when naming the parties to an agreement. Other indicia in this field may be "company name" or the like. A "personal name" field is a field that is configured to receive characters indicating a name of a person, such as when naming the parties to an agreement. Other indicia in this field may be "put your name here" or the like. An "email address" field is a field that is configured to receive an email address of an entity and/or include other indicia, such as "put email here." A "job title" field is a field that is configured to receive characters that indicate a user's job title and/or include other indicia, such as "job title." A "residential address" or "business address" field is a field that is configured to receive characters that indicate a home or business address of a user and/or include other indicia, such as "put address here."

In some embodiments, the second request to input the field at block 1208 may not be strictly based on user input. Rather, machine learning functionality (e.g., as described with respect to FIG. 9 through 11) can be used to automatically request or predict the field. For instance, prior to the receiving of the first request, some embodiments receive historical user input of the first user (e.g., previous documents, emails, chats, etc. that the user has generate). And prior to the receiving of the second request, these embodiments automatically predict, via a machine learning model, that the document will include the field based on the historical input. And based on the prediction, these embodiments cause presentation of a user interface element (e.g., the message 1103 of FIG. 11) indicative of proposing, to the user, the field for incorporation into the document. In some embodiments, the user selection is based on the presentation of the user interface element. For example, the user may only select the field to place next to the first partial string only because these embodiments have predicted and suggested that the user put the field next to the first partial string. These embodiments are described in detail with respect to FIG. 9, FIG. 10, and FIG. 11.

Per block 1210, some embodiments automatically cause generation or display, at the document on the first page of the user device of the field next to a first partial string. This can be at least partially in response to the receiving of the second request. In some embodiments, however, the field is not generated on the first page, but a different page. The term "next to" is relative and may contemplate any suitable distance or position threshold relative to the first partial string. For example, using user interface terminology, the field may be placed on the same gridline and single spaced to the right of the first partial string. Grid systems help visually align page elements using sequenced columns and rows. Further, by being placed next to strings, in some embodiments, fields themselves (when they are populated by field assignees) are indicative of at least a portion of completion of partial strings since they will eventually contain the text that completes a portion of the partial string. Examples of block 1210 are described with respect to FIG. 5D, where the field 208 is placed next to the partial string 206 at the document 214 of the page 200.

Some embodiments perform additional functionality, as described herein. For example, some embodiments assign one or more fields to a second user based on user input from the user, where the assigning is indicative of authorizing only the second user, an no other users, to populate the one or more fields. Examples of field assignment is described in FIG. 4. In response to the assignment, some embodiments automatically cause a transmission, over the computer network, of an indication (e.g., a notification, message, or the document itself) to a device (e.g., user device or email server) associated with the second user, where the second user is able to populate the field, at the document, based on the assigning of the field and the transmission of the indication. Examples of this are described with respect to FIG. 5A through FIG. 5D.

Some embodiments additionally or alternatively generate and store templates for later use, as described, for example, with respect to FIGS. 7A and 7B. In these embodiments, for example, the generation of the field next to the first partial string (block 1210) occurs as part of a first session (e.g., a web session). Embodiments can receive a plurality of strings (e.g., strings 206 and 208) based on user input at the user device and at the document, where the plurality of strings includes the first partial string (e.g., string 206). Based on a user selection at the first page (e.g., selection of the button 704 of FIG. 7A), these embodiments store, in computer memory (or other storage), the plurality of strings, where the plurality of strings are indicative of a template to be used for one or more future sessions (e.g., web sessions). Subsequent to this storing, particular embodiments receive, at a second session (e.g., web session), a request to access, from the computer memory, the plurality of strings, as described, for example, with respect to FIG. 7B. In response to receiving of the request to access, particular embodiments cause display, during the second session, of the plurality of strings.

Some embodiments additionally or alternatively receive a first indication that the user has invited a second user to collaborate with the user to view or edit the document. In response to the receiving of this indication, some embodiments automatically store, in computer memory (or other storage), a first copy of the document. Some embodiments then receive a second indication that a milestone associated with the second user has been reached (e.g., an X amount of time has gone by, or the second user has generated a threshold quantity of changes at the document). In response to the receiving of the second indication, these embodiments automatically store, in the computer memory, a second copy of the document. These embodiments then determine a difference between the first copy and the second copy (via comparison). Based on the determination of the difference, these embodiments tag (e.g., highlight or flag) one or more strings that have been added, deleted, or otherwise modified between the first copy and the second copy. In this way, the display screen of the user device includes an indication (e.g., a displayed highlight) of the tagged strings and additional strings that are not tagged such that the user is able to distinguish how the document has been changed. Examples of all of this functionality is described with respect to FIG. 6.

In some embodiments, subsequent to the automatic generation of the field at block 1210, a second string is caused to be displayed at the user device and at the first page next to the field based on additional user input of the second string, where the second string is a completion of the first partial string. Examples of this are described with respect to FIG. 2, where the string 216 is caused to be displayed to the right of the field 208.

Some embodiments additionally or alternatively receive an indication that a field assignee has input an electronic signature at the field of the document. And in response to the receiving of the indication, these embodiments automatically cause presentation at the document of the electronic signature such that the user (e.g., the field assignor) can view the electronic signature in near real-time relative to when the field assignee input the electronic signature at the field. In this way, when multiple parties have to sign an agreement, each party can view the signatures in near real-time on the same document.

In response to receiving an indication that a first user corresponding to a field assignee has signed a document, particular embodiments automatically save or upload the changes to the document so that any user can view it. As described herein, in some embodiments, the document is web application document, such as an HTML document. Accordingly, when the assignee is brought to the same HTML document that that the creator (field assignor) made, any changes or fields that the assignee makes, will change the document since it is part of the web application. Accordingly, in some of these embodiments, the document that the assignor uses is the very same document that the assignee signs and so the assignor can view any of these changes by, for example, logging into the corresponding web application and requesting access to the document. Some embodiments additionally and automatically cause a notification (e.g., SMS or email) to be sent to a device (e.g., user device) associated with the assignor so that the field assignor knows exactly when the field assignee signs the field. In an illustrative example, referring back to FIG. 5D, in response to receiving an indication that the assignee has selected the sign button 516, particular embodiments automatically cause presentation of the electronic signature at the document 214 and/or cause presentation of a notification to a device of the field assignor to immediately notify the field assignor that the field assignee has signed the document.

In response to the generation of the field next to the first partial string, some embodiments receive an indication that the user has selected a field type (that indicates the predetermined category) for the field (though the field itself may be indicative of a field type itself). And in response to the receiving of this indication, these embodiments cause display, at the field and on the first page, a string that indicates the field type. Examples of this is described with respect to FIG. 2, where embodiments can receive an indication that the user has selected a field type at the UI element 212, and responsively causes generation of corresponding indicia at the field 208 all within the page 200.

Figure 13:
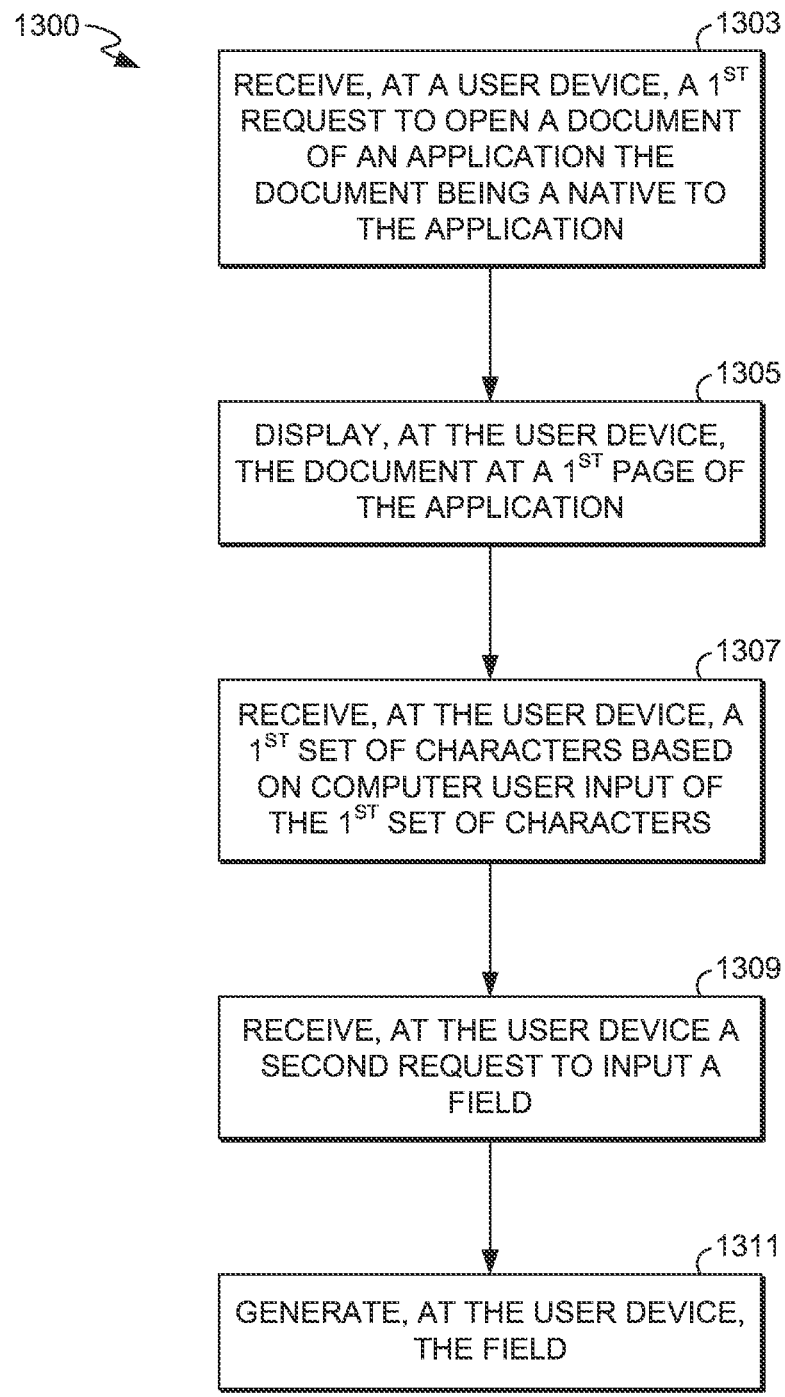
FIG. 13 is a flow diagram of an example process for generating a field, according to some embodiments.

FIG. 13 is a flow diagram of an example process 1300 for generating a field, according to some embodiments. In some embodiments, the process 1300 is performed by or at a user device (e.g., a mobile phone), and is thus from the perspective of the front-end. Per block 1303, the user device receives a first request to open a document of an application (e.g., a web application), where the document is native (e.g., a native component) to the application. In some embodiments, but not all (including in the process 1200), the document requires at least one electronic signature by one or more entities. For example, a user device may receive an indication that a user has employed a gesture to open an app page on her user device after opening a corresponding app. In some embodiments, block 1303 includes similar or identical functionality as described with respect to block 1202 of FIG. 12.

Per block 1305, the user device displays (or generates) the document at a first page of the application, which may be at least partially in response to the receiving of the first request. In some embodiments, block 1305 includes similar or identical functionality as described with respect to block 1204 of FIG. 12. Per block 1307, the user device receives a first set of characters (e.g., a partial string) based on computer user input of the first set of characters. In some embodiments, the first set of characters are also input at the document at a first page. In some embodiments, block 1307 includes identical or similar functionality, as described with respect to 1206 of FIG. 12.

Per block 1309, the user device receives a second request to input a field at the document. In some embodiments, the field is a data object for which one or more users are to input data at the field according to a predetermined category, and where the field is associated with the first set of characters (e.g., because it is to be placed next to the first set of characters or helps complete a sentence of the first set of characters). In some embodiments, the receiving of the second request is based on a selection at the first page via a user at the user device. In some embodiments, however, the receiving of the second request is automatically received (and not via a user selection) via the document element prediction module 124 based on a machine learning model predicting the field and sending the prediction to the user device for generation and display at block 1311. In some embodiments, block 1309 includes identical or similar functionality as described with respect to block 1208 of FIG. 12.

Per block 1311, the user device generates the field. In some embodiments, block 1311 is performed at least partially in response to the receiving of the second request. In some embodiments, the field is generated at the document on the first page. In some embodiments, block 1311 includes identical or similar functionality as described with respect to block 1210 of FIG. 12. In some embodiments, the process 1300 includes additional functionality, as described with respect to the templates, real-time functionality, document collaboration, and the like, after block 1210 of FIG. 12.

Figure 14:
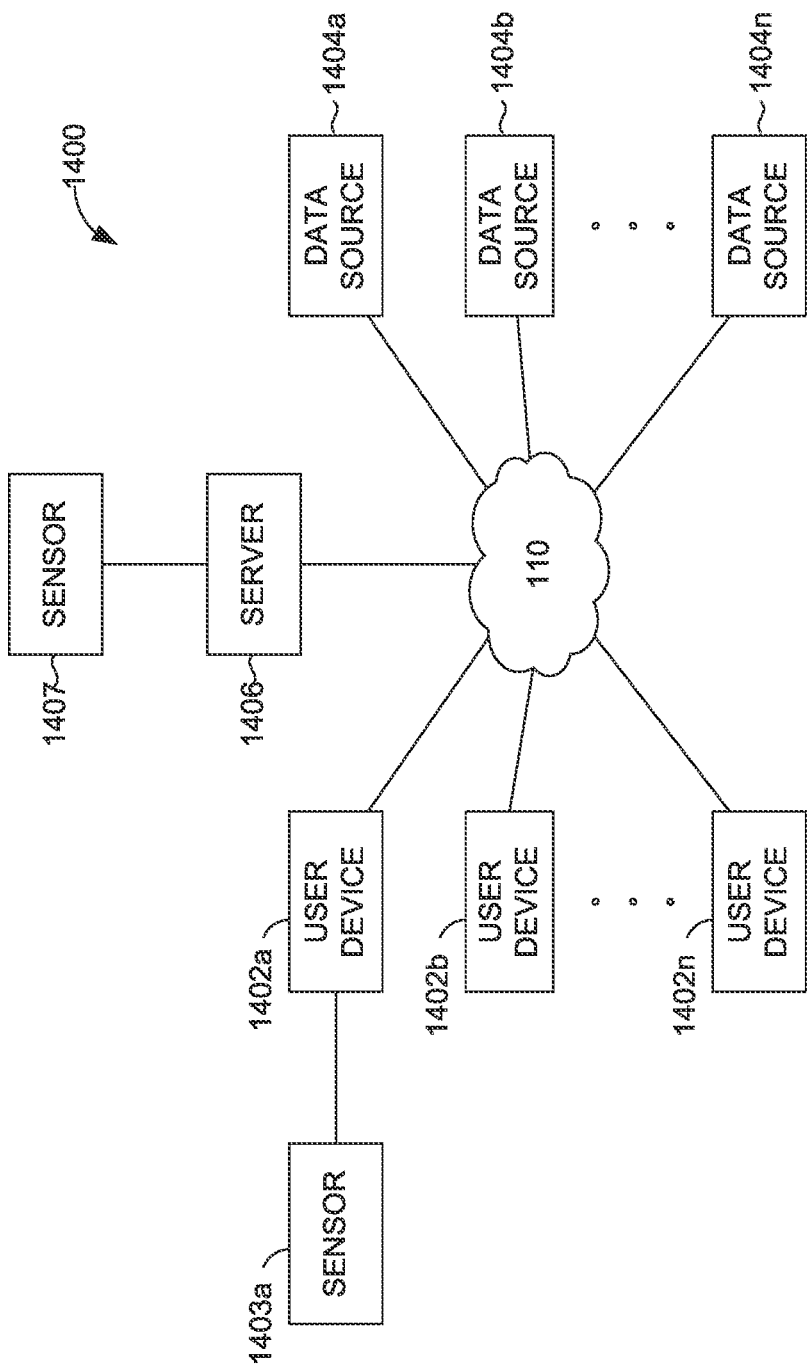
FIG. 14 is a block diagram illustrating an example operating environment in which some embodiments of the present disclosure may be employed.

Turning now to FIG. 14, a block diagram is provided showing an example operating environment 1400 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 1400 includes a number of user devices, such as user devices 1402*a* and 1402*b* through 1402*n*; a number of data sources, such as data sources 1404*a* and 1404*b* through 1404*n*; server 1406; sensors 1403*a* and 1407; and network(s) 110. It should be understood that operating environment 1400 shown in FIG. 14 is an example of one suitable operating environment. Each of the components shown in FIG. 14 may be implemented via any type of computing device, such as the computing device 1500 described in connection to FIG. 15, for example. These components may communicate with each other via network(s) 110, which may include, without limitation, one or more local area networks (LANs) and/or wide area networks (WANs). In exemplary implementations, network(s) 110 comprises the Internet and/or a cellular network, amongst any of a variety of possible public and/or private networks.

It should be understood that any number of user devices, servers, and data sources may be employed within operating environment 1400 within the scope of the present disclosure. Each may comprise a single device or multiple devices cooperating in a distributed environment. For instance, server 1406 may be provided via multiple devices arranged in a distributed environment that collectively provide the functionality described herein. Additionally, other components not shown may also be included within the distributed environment.

User devices 1402*a* and 1402*b* through 1402*n* can be client devices on the client-side of operating environment 1400, while server 1406 can be on the server-side of operating environment 1400. Server 1406 can comprise server-side software designed to work in conjunction with client-side software on user devices 1402*a* and 1402*b* through 1402*n* so as to implement any combination of the features and functionalities discussed in the present disclosure. This division of operating environment 1400 is provided to illustrate one example of a suitable environment, and there is no requirement for each implementation that any combination of server 1406 and user devices 1402*a* and 1402*b* through 1402*n* remain as separate entities.

User devices 1402*a* and 1402*b* through 1402*n* may comprise any type of computing device capable of use by a user. For example, in one embodiment, user devices 1402*a* through 1402*n* may be the type of computing device described in relation to FIG. 15 herein. By way of example and not limitation, a user device may be embodied as a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable computer device.

Data sources 1404a and 1404b through 1404n (e.g., the data store 105) may comprise data sources and/or data systems, which are configured to make data available to any of the various constituents of operating environment 1400, or system 100 described in connection to FIG. 1. Data sources 1404a and 1404b through 1404n may be discrete from user devices 1402a and 1402b through 1402n and server 1406 or may be incorporated and/or integrated into at least one of those components. In one embodiment, one or more of data sources 1404a through 1404n comprise one or more sensors 1403a, 1407, which may be integrated into or associated with one or more of the user device(s) 1402a, 1402b, or 1402n or server 1406.

Operating environment 1400 can be utilized to implement one or more of the components of the system 100, described in FIG. 1. For example, the server 1406 (and/or the user device 1402) may include the field generation module 102, the collaboration module 112, the template generation module 116, the presentation module 118, the recipient signing module 122, the document element prediction module 124, and/or the consumer application.

Figure 15:
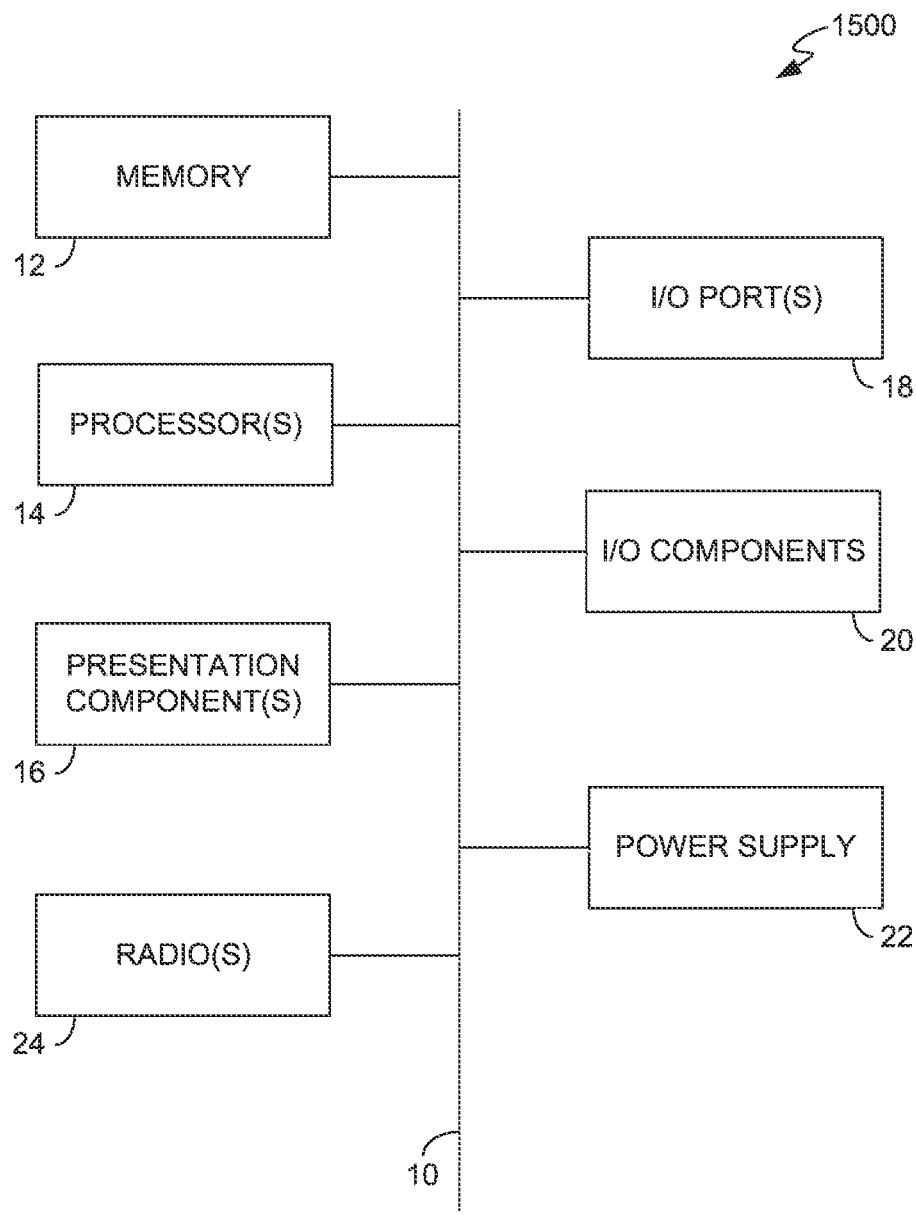
FIG. 15 is a block diagram of a computing device for which embodiments of this disclosure are employed.

Having described various implementations, an exemplary computing environment suitable for implementing embodiments of the disclosure is now described. With reference to FIG. 15, an exemplary computing device is provided and referred to generally as the computing device 1500. The computing device 1500 is but one example of a suitable computing environment and is not intended to suggest any limitation as to the scope of use or functionality of embodiments of the disclosure. Neither should the computing device 1500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 15, the computing device 1500 includes a bus 10 that directly or indirectly couples the following devices: memory 12, one or more processors 14, one or more presentation components 16, one or more input/output (I/O) ports 18, one or more I/O components 20, and an illustrative power supply 22. Bus 10 represents what may be one or more busses (such as an address bus, data bus, or combination thereof). Although the various blocks of FIG. 15 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 15 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 15 and with reference to "computing device."

The computing device 1500 typically includes a variety of computer-readable media. Computer-readable media can be any available media that can be accessed by the computing device 1500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by the computing device 1500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 12 includes computer storage media in the form of volatile and/or nonvolatile memory. The memory may be removable, non-removable, or a combination thereof. Exemplary hardware devices include solid-state memory, hard drives, optical-disc drives, etc. The computing device 1500 includes one or more processors 14 that read data from various entities such as memory 12 or I/O components 20. Presentation component(s) 16 presents data indications to a user or other device. In some implementations, presentation module 118 of system 100 may be embodied as a presentation component 16. Other examples of presentation components may include a display device, speaker, printing component, vibrating component, and the like.

The I/O ports 18 allows the computing device 1500 to be logically coupled to other devices, including I/O components 20, some of which may be built in. Illustrative components include a microphone, joystick, game pad, satellite dish, scanner, printer, wireless device, etc. The I/O components 20 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1500. The computing device 1500 may be equipped with depth cameras, such as stereoscopic camera systems, infrared camera systems, RGB camera systems, and combinations of these, for gesture detection and recognition. Additionally, the computing device 1500 may be equipped with accelerometers or gyroscopes that enable detection of motion. The output of the accelerometers or gyroscopes may be provided to the display of the computing device 1500 to render immersive augmented reality or virtual reality.

Some embodiments of computing device 1500 may include one or more radio(s) 24 (or similar wireless communication components). The radio 24 transmits and receives radio or wireless communications. The computing device 1500 may be a wireless terminal adapted to receive communications and media over various wireless networks. Computing device 1500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (for example, a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

In some embodiments, a computerized system, such as the computerized system described in any of the embodiments above, comprise computer storage memory having computer-executable instructions stored thereon which, when executed by the one or more processors, implement a method comprising receiving, over a computer network, a first request to open a document of a web application. The document being native to the web application. The document requiring at least one electronic signature by one or more entities. The first request being issued at a user device associated with a user. The method of the system further comprises in response to the receiving of the first request, causing display, at the user device, of the document at a first page of the web application. The method of the system further comprises causing generation of a first partial string based on computer user input of first partial string at the document on the first page. The method of the system further comprises subsequent to the generation of the first partial string, receiving, over the computer network and via a selection at the first page, a second request to input a field next to the first partial string. The field being a data object corresponding to a predetermined category for which one or more users are to input data at the field according to the predetermined category. The method of the system further comprises in response to the receiving of the second request, automatically causing generation, at the document on the first page, of the field next to the first partial string.

Advantageously, these and other embodiments, as described herein, improve existing web application because these embodiments do not require document conversion since they employ a document and text editor that is native to the application, so that the user is free to directly work in the document at the application. Thus, the user does not have to first open a WORD document that is locally stored to the user device and input natural language characters indicative of an agreement. As such, the user device also does not have to continuously send and receive, over the computer network, the document to and from other parties' devices with "track changes" functionality in order to finalize the document between all parties. Rather, particular embodiments employ automated collaboration functionality that allows users to view the native document based on milestone changes at the web application, as described in more detail below. Various web application embodiments do not require the user to upload the document in PDF format only. Additionally, computer storage, I/O, and network storage costs are reduced, as described herein.

In any combination of the above embodiments of the computerized system, the method further comprises: automatically formatting of at least one of: the first partial string or the field at the document on the first page based at least in part on a screen size of the user device.

In any combination of the above embodiments of the computerized system, the method further comprises: assigning the field to a second user based on second computer user input from the user, the assigning being indicative of authorizing only the second user, and no other users, to populate the field; and in response to the assigning, automatically causing a transmission, over the computer network, of an indication to a device associated with the second user, wherein the second user is able to populate the field, at the document, based on the assigning of the field and the transmission of the indication.

In any combination of the above embodiments of the computerized system, generation of the field next to the first partial string occurs as part of a first web session, and wherein the method further comprises: receiving a plurality of strings based on second computer user input at the user device and at the document, the plurality of strings including the first partial string; based on a user selection at the first page, storing, in computer memory, the plurality of strings, the plurality of strings being indicative of a template to be used for one or more future web sessions; subsequent to the storing, receiving, at a second web session, a request to access, from the computer memory, the plurality of strings;

and in response to the receiving of the request to access, causing display, during the second web session, of the plurality of strings.

In any combination of the above embodiments of the computerized system, the field is one field of a group of fields consisting of: a signature field, a company name field, a personal name field, an email address field, a job title field, or a residential or business address field.

In any combination of the above embodiments of the computerized system, the method further comprises: receiving a first indication that the user has invited a second user to collaborate with the user to view or edit the document; in response to the receiving of the indication, automatically store, in computer memory, a first copy of the document; receiving a second indication that a milestone associated with the second user has been reached; and in response to the receiving of the second indication, automatically store, in the computer memory, a second copy of the document.

In any combination of the above embodiments of the computerized system, the method further comprises: determining a difference between the first copy and the second copy; and based on the determination of the difference, tag one or more strings that have been added, deleted, or modified between the first copy and the second copy, wherein a display screen of the user device includes an indication of the tagged one or more strings and additional strings that are not tagged such that the user is able to distinguish how the document has been changed.

In any combination of the above embodiments of the computerized system, the method further comprises: prior to receiving the first request, receiving historical user input of the user; prior to the receiving of the second request, automatically predicting, via a machine learning model, that the document will include the field based on at least one of: the historical input and natural language processing of the first partial string; and based on the prediction, causing presentation of a user interface element indicative of proposing, to the user, the field for incorporation into the document, wherein the selection at the first page is based on the presentation of the user interface element.

In any combination of the above embodiments of the computerized system, the method further comprises: subsequent to the automatic generation of the field, causing display, at the user device and at the first page next to the field, a second string based on additional user input of the second string, the second string being a completion of the first partial string.

In any combination of the above embodiments of the computerized system, the method further comprises: receiving an indication that a field assignee has input an electronic signature at the field of the document; and in response to the receiving of the indication, automatically causing presentation at the document of the electronic signature such that the user can view the electronic signature in near real-time relative to when the field assignee input the electronic signature at the field.

In any combination of the above embodiments of the computerized system, the method further comprises: in response to the generation of the field next to the first partial string, receiving an indication that the user has selected a field type for the field; and in response to the receiving of the indication, cause display, at the field and on the first page, a string that indicates the field type.

In some embodiments, a computer-implemented method is provided. The method includes receiving, at a user device, a first request to open a document of an application. The document being native to the application. The document requiring at least one electronic signature by one or more entities. The method further includes at least partially in response to the receiving of the first request, displaying, at the user device, the document at a first page of the application. The method further includes receiving, at the user device, a first set of characters based on a computer user input of the first set of characters at the document on the first page. The method further includes receiving, at the user device via a selection at the first page, a second request to input a field, the field being a data object for which one or more users are to input data at the field according to a predetermined category. The field being associated with the first set of characters. The method further includes at least partially in response to the receiving of the second request, automatically generating, at the document on the first page and at the user device, the field.

Advantageously, these and other embodiments, as described herein, improve existing technologies because they automatically format content at documents based at least in part on user device screen size or type. As described above, documents uploaded to DOCHUB® and DOCUSIGN® are not mobile responsive when users try to open them using the web browser in the mobile device. However, various embodiments are mobile responsive because they automatically format a document by automatically wrapping natural language text and/or fields or otherwise change position in documents based on new rules according to device screen size. Additionally, computer storage, I/O, and network storage costs are reduced, as described herein.

In any combination of the above embodiments of the computer-implemented method, the method further comprises automatically displaying, at the user device, at least one of: the first set of characters or the field at the document on the first page based at least in part on a user device type of the user device.

In any combination of the above embodiments of the computer-implemented method, the method further comprises causing an assigning of the field to a second user based on user input from the user, the assigning being indicative of authorizing only the second user, and no other users, to populate the field; and in response to the assigning, automatically causing a transmission of an indication to a device associated with the second user, wherein the second user is able to populate the field, at the document, based on the assigning of the field and the transmission of the indication.

In any combination of the above embodiments of the computer-implemented method, the generation of the field next to the first set of characters occurs as a part of a first web session, and wherein the method further comprises: receiving a plurality of strings based on a user input at the user device and at the document, the plurality of strings including the first set of characters; receiving, at a second web session, a request to access, from a computer memory, the plurality of strings; and in response to the receiving of the request to access, display, during the second web session, of the plurality of strings.

In any combination of the above embodiments of the computer-implemented method, the field is one field of a group of fields consisting of: a signature field, a company name field, a personal name field, an email address field, a job title field, or a residential or business address field.

In any combination of the above embodiments of the computer-implemented method, the method further comprises subsequent to the automatic generation of the field, displaying, at the user device and at the first page next to the field, a second set of characters based on additional user input of the second set of characters, the second set of characters being a completion of the first set of characters.

In any combination of the above embodiments of the computer-implemented method, the method further comprises in response to the generation of the field next to the first set of characters, receiving an indication that the user has selected a field type for the field; and in response to the receiving of the indication, display, at the field and on the first page, a string that indicates the field type.

In some embodiments, one or more computer storage media is provided. Such computer storage media has computer-executable instructions embodied thereon that, when executed, by one or more processors, cause the one or more processors to perform a method. The method comprising receiving a first request to open a document of an application. The document being a part of the application. The method further comprising at least partially in response to the receiving of the first request, causing display, at a user device, of the document. The method further comprising receiving a first set of characters based on computer user input of the first set of characters at the document. The method further comprising receiving a second request to input a field. The field being a data object for which one or more users are to input data at the field according to a predetermined category. The field being associated with the first set of characters. The method further comprising, at least partially in response to the receiving of the second request, automatically causing generation, at the document and at the user device, of the field.

Advantageously, these and other embodiments, as described herein, improve existing web application because these embodiments do not require document conversion since they employ a document and text editor that is native to the application, so that the user is free to directly work in the document at the application. Thus, the user does not have to first open a WORD document that is locally stored to the user device and input natural language characters indicative of an agreement. As such, the user device also does not have to continuously send and receive, over the computer network, the document to and from other parties' devices with "track changes" functionality in order to finalize the document between all parties. Rather, particular embodiments employ automated collaboration functionality that allows users to view the native document based on milestone changes at the web application, as described in more detail below. Various web application embodiments do not require the user to upload the document in PDF format only. Additionally, computer storage, I/O, and network storage costs are reduced, as described herein.

In any combination of the above embodiments of the one or more computer storage media, the method further comprises automatically formatting of at least one of: the first set of characters or the field at the document based at least in part on a screen size of the user device.

What is claimed is:

1. A computerized system comprising:
   one or more processors; and
   computer storage memory having computer-executable instructions stored thereon which, when executed by the one or more processors, implement a method comprising:
   receiving, over a computer network, a first request to open a document of a web application, the document being native to the web application, the document requiring at least one electronic signature by one or more entities, the first request being issued at a user device associated with a user;
   in response to the receiving of the first request, causing display, at the user device, of the document at a first page of the web application; causing generation of a first partial string based on computer user input of first partial string at the document on the first page, the first partial string being a first portion of a first sentence;
   subsequent to the generation of the first partial string, receiving, over the computer network and via a selection at the first page, a second request to input a field next to the first partial string, the field being a data object corresponding to a predetermined category for which a second user is to input data within the field according to the predetermined category, the data of the field corresponding to a second portion of the first sentence;
   in response to the receiving of the second request, automatically causing generation, at the document on the first page, of the field next to the first partial string;
   receiving a first indication that the user has invited the second user to collaborate with the user to view or edit the document;
   in response to the receiving of the first indication, automatically store, in computer memory, a first copy of the document;
   receiving a second indication that a milestone associated with the second user has been reached;
   in response to the receiving of the second indication, automatically store, in the computer memory, a second copy of the document;
   determining a difference between the first copy and the second copy; and
   based on the determination of the difference, tag one or more strings that have been added, deleted, or modified between the first copy and the second copy, wherein a display screen of the user device includes an indication of the tagged one or more strings and additional strings that are not tagged such that the user is able to distinguish how the document has been changed.

2. The computerized system of claim 1, wherein the method further comprises:
   responsive to the second request and as a part of the automatic generation of the field next to the first partial string, automatically moving at least one of: the first partial string or the field from a first line to a second line in the document on the first page based at least in part on a screen size of the user device.

3. The computerized system of claim 1, wherein the method further comprises:
   subsequent to the automatic generation of the field next to the first partial string at the document on the first page, assigning the field to the second user based on second computer user input from the user, the assigning being indicative of authorizing only the second user, and not the first user, to populate the field; and
   in response to the assigning, automatically causing a transmission, over the computer network, of an indication to a device associated with the second user, wherein the second user is able to populate the field, at the document, based on the assigning of the field and the transmission of the indication.

4. The computerized system of claim 1, wherein generation of the field next to the first partial string occurs as part of a first web session, and wherein the method further comprises:
   receiving a plurality of strings based on second computer user input at the user device and at the document, the plurality of strings including the first partial string;

based on a user selection at the first page, storing, in computer memory, the plurality of strings, the plurality of strings being indicative of a template to be used for one or more future web sessions;

subsequent to the storing, receiving, at a second web session, a request to access, from the computer memory, the plurality of strings; and in response to the receiving of the request to access, causing display, during the second web session, of the plurality of strings.

5. The computerized system of claim 1, wherein the field is one field of a group of fields consisting of: a signature field, a company name field, a personal name field, an email address field, a job title field, or a residential or business address field.

6. The computerized system of claim 1, wherein the method further comprises:

prior to receiving the first request, receiving historical user input of the user;

prior to the receiving of the second request, automatically predicting, via a machine learning model, that the document will include the field based on at least one of: the historical input and natural language processing of the first partial string; and based on the prediction, causing presentation of a user interface element indicative of proposing, to the user, the field for incorporation into the document, wherein the selection at the first page is based on the presentation of the user interface element.

7. The computerized system of claim 1, wherein the method further comprises:

receiving an indication that a field assignee has input an electronic signature at the field of the document; and in response to the receiving of the indication, automatically causing presentation at the document of the electronic signature such that the user can view the electronic signature in near real-time relative to when the field assignee input the electronic signature at the field.

8. The computerized system of claim 1, wherein the method further comprises:

in response to the generation of the field next to the first partial string, receiving an indication that the user has selected a field type for the field; and in response to the receiving of the indication, automatically cause display, within the field and on the first page, a string that describes the field type.

9. A computer-implemented method comprising:

receiving, at a user device, a first request to open a document of an application, the document being native to the application, the document requiring at least one electronic signature by one or more entities;

at least partially in response to the receiving of the first request, displaying, at the user device, the document at a first page of the application;

receiving, at the user device, a first set of characters based on a computer user input of the first set of characters at the document on the first page, the first set of characters being a first portion of a first sentence;

receiving, at the user device via a selection at the first page, a second request to input a field, the field being a data object for which one or more users are to input data within the field according to a predetermined category, the data of the field corresponding to a second portion of the first sentence;

at least partially in response to the receiving of the second request, automatically generating, at the document on the first page and at the user device, the field;

receiving a first indication that a first user, of the one or more users, has invited a second user, of the one or more users, to collaborate with the first user to view or edit the document;

in response to the receiving of the first indication, automatically store, in computer memory, a first copy of the document;

receiving a second indication that a milestone associated with the second user has been reached;

in response to the receiving of the second indication, automatically store, in the computer memory, a second copy of the document;

determining a difference between the first copy and the second copy; and based on the determination of the difference, tag one or more strings that have been added, deleted, or modified between the first copy and the second copy, wherein a display screen includes an indication of the tagged one or more strings and additional strings that are not tagged such that at least one of: the first user or the second user is able to distinguish how the document has been changed.

10. The computer-implemented method of claim 9, further comprising:

automatically displaying, at the user device, at least one of: the first set of characters or the field at the document on the first page based at least in part on a user device type of the user device.

11. The computer-implemented method of claim 9, further comprising:

causing an assigning of the field to a second user based on user input from the user, the assigning being indicative of authorizing only the second user, and no other users, to populate the field; and in response to the assigning, automatically causing a transmission of an indication to a device associated with the second user, wherein the second user is able to populate the field, at the document, based on the assigning of the field and the transmission of the indication.

12. The computer-implemented method of claim 9, wherein generation of the field next to the first set of characters occurs as a part of a first web session, and wherein the method further comprises:

receiving a plurality of strings based on a user input at the user device and at the document, the plurality of strings including the first set of characters;

receiving, at a second web session, a request to access, from a computer memory, the plurality of strings; and in response to the receiving of the request to access, display, during the second web session, of the plurality of strings.

13. The computer-implemented method of claim 9, wherein the field is one field of a group of fields consisting of: a signature field, a company name field, a personal name field, an email address field, a job title field, or a residential or business address field.

14. The computer-implemented method of claim 9, wherein the second set of characters are a completion of the first set of characters such that the first sentence is complete when the first set of characters, the field, and the second set of characters are displayed at the first page.

15. The computer-implemented method of claim 9, further comprising:
- in response to the generation of the field next to the first set of characters, receiving an indication that the user has selected a field type for the field; and
- in response to the receiving of the indication, display, at the field and on the first page, a string that indicates the field type.

16. One or more non-transitory computer storage media having computer-executable instructions embodied thereon that, when executed, by one or more processors, cause the one or more processors to perform a method, the method comprising:
- receiving a first request to open a document of an application, the document being a part of the application;
- at least partially in response to the receiving of the first request, causing display, at a user device, of the document;
- receiving a first set of characters based on computer user input of the first set of characters at the document the first set of characters being a first portion of a first sentence;
- receiving a second request to input a field, the field being a data object for which one or more users are to input data within the field according to a predetermined category, the data of the field associated with a second portion of the first sentence;
- at least partially in response to the receiving of the second request, automatically causing generation, at the document and at the user device, of the field;
- receiving a first indication that a first user has invited a second user to collaborate with the first user to view or edit the document;
- in response to the receiving of the first indication, automatically store, in computer memory, a first copy of the document;
- receiving a second indication that a milestone associated with the second user has been reached;
- in response to the receiving of the second indication, automatically store, in the computer memory, a second copy of the document;
- determining a difference between the first copy and the second copy; and
- based on the determination of the difference, tag one or more strings that have been added, deleted, or modified between the first copy and the second copy, wherein a display screen includes an indication of the tagged one or more strings and additional strings that are not tagged such that at least one of: the first user or the second user is able to distinguish how the document has been changed.

17. The one or more non-transitory computer storage media of claim 16, wherein the method further comprises:
- automatically formatting of at least one of: the first set of characters or the field at the document based at least in part on a screen size of the user device.

* * * * *